United States Patent
Park et al.

(10) Patent No.: US 11,709,606 B2
(45) Date of Patent: Jul. 25, 2023

(54) MEMORY CONTROLLER AND OPERATING METHOD THEREOF

(71) Applicant: SK hynix Inc., Icheon-si (KR)

(72) Inventors: Gyung Min Park, Icheon-si (KR); Keon Yeong Lee, Icheon-si (KR); Jae Gwang Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 202 days.

(21) Appl. No.: 17/171,511

(22) Filed: Feb. 9, 2021

(65) Prior Publication Data
US 2022/0057938 A1    Feb. 24, 2022

(30) Foreign Application Priority Data

Aug. 21, 2020  (KR) ......................... 10-2020-0105527

(51) Int. Cl.
*G06F 3/06* (2006.01)

(52) U.S. Cl.
CPC ............ *G06F 3/064* (2013.01); *G06F 3/0614* (2013.01); *G06F 3/0631* (2013.01); *G06F 3/0632* (2013.01); *G06F 3/0652* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 2017/0322888 | A1* | 11/2017 | Booth | G06F 12/0246 |
| 2019/0179548 | A1* | 6/2019 | Lee | G06F 3/061 |
| 2020/0004308 | A1* | 1/2020 | Moritomo | G06F 1/28 |

FOREIGN PATENT DOCUMENTS

| KR | 10-1915073 | B1 | 12/2015 |
| KR | 10-2019-0074680 | A | 6/2019 |

* cited by examiner

*Primary Examiner* — Charles Rones
*Assistant Examiner* — Jonah C Krieger

(57) ABSTRACT

A memory controller controls a memory device including memory blocks, and can equalize wear levels of cores for controlling memory devices. The memory controller includes: cores for controlling the zones; a reset information controller for generating reset count values representing a number of reset requests input with respect to the zones, in response to a reset request, and generating reset count sum values obtained by summing reset count values of zones controlled by each of the cores; and a wear level manager for controlling the cores such that a core that is different from a first core having a highest reset count sum value from among the cores controls some of zones controlled by the first core according to whether a difference value between the highest reset count sum value and a lowest reset count sum value from among the reset count sum values exceeds a threshold difference value.

19 Claims, 21 Drawing Sheets

FIG. 8A

|  | Zone 1 | Zone 2 | Zone 3 | ... | Zone N |
|---|---|---|---|---|---|
| Reset Count | 4 | 9 | 3 | ... | 6 |

FIG. 8B

|  | A CORE | B CORE | C CORE | D CORE |
|---|---|---|---|---|
| Sum of Reset Counts | 54 | 68 | 46 | 59 |

FIG. 8C

|  | SB 1 | SB 2 | SB 3 | ... | SB N |
|---|---|---|---|---|---|
| Erase Count | 3 | 12 | 1 | ... | 5 |

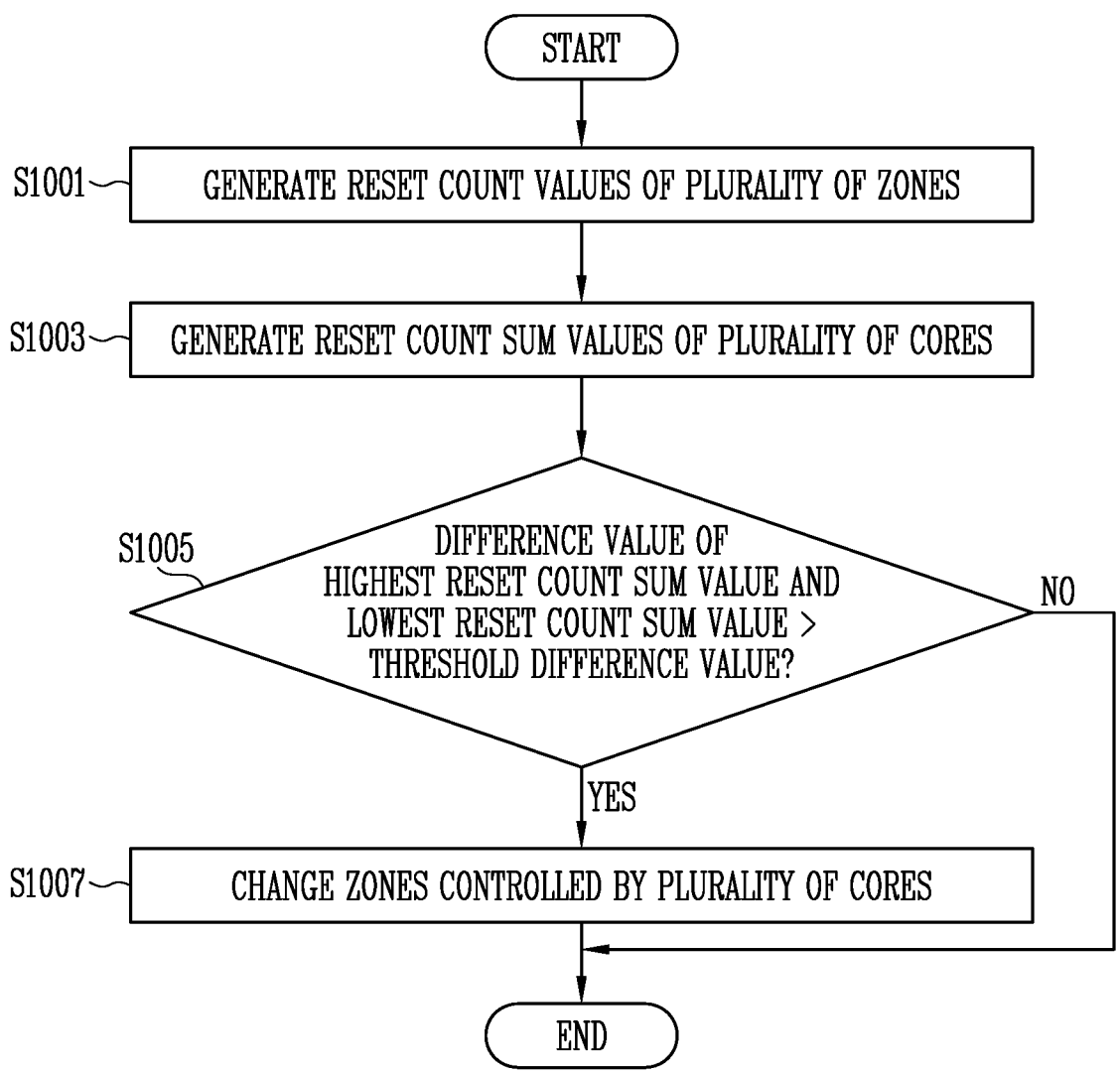

MEMORY CONTROLLER AND OPERATING METHOD THEREOF

CROSS-REFERENCE TO RELATED APPLICATION

The present application claims priority under 35 U.S.C. § 119(a) to Korean patent application number 10-2020-0105527 filed on Aug. 21, 2020, in the Korean Intellectual Property Office, the entire disclosure of which is incorporated by reference herein.

BACKGROUND

1. Technical Field

The present disclosure generally relates to an electronic device, and more particularly, to a memory controller and an operating method thereof.

2. Related Art

A storage device is a device that stores data under the control of a host device such as a computer or a smart phone. The storage device may include a memory device for storing data and a memory controller for controlling the memory device. A memory device is classified into a volatile memory device and a nonvolatile memory device.

A volatile memory device is a memory device in which data is stored only when power is supplied, and in which stored data disappears when the supply of power is interrupted. Examples of a volatile memory device may include a Static Random Access Memory (SRAM), a Dynamic Random Access Memory (DRAM), and the like.

A nonvolatile memory device is a memory device in which data does not disappear even when the supply of power is interrupted. Examples of a nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments provide a memory controller capable of equalizing wear levels of a plurality of cores for controlling a plurality of zones, and an operating method of the memory controller.

In accordance with an aspect of the present disclosure, there is provided a memory controller for controlling a memory device including a plurality of memory blocks allocated to a plurality of zones, the memory controller including: a plurality of cores configured to control the plurality of zones; a reset information controller configured to generate reset count values representing a number of a reset request input with respect to the plurality of zones, in response to the reset request input from a host, and configured to generate reset count sum values obtained by summing the reset count values of a plurality of zones controlled by each of the plurality of cores; and a wear level manager configured to control the plurality of cores such that a core that is different from a first core having a highest reset count sum value from among the plurality of cores controls some of a plurality of zones controlled by the first core according to whether a difference value between the highest reset count sum value and a lowest reset count sum value from among the reset count sum values exceeds a threshold difference value.

In accordance with another aspect of the present disclosure, there is provided a memory controller for controlling a memory device including a plurality of memory blocks allocated to a plurality of zones, the memory controller including: a plurality of cores configured to control the plurality of zones; a reset information controller configured to generate reset count values representing a number of a reset request input with respect to the plurality of zones, in response to the reset request input from a host, and configured to generate erase count values representing a number of times an erase operation is performed on a plurality of memory block groups respectively corresponding to a plurality of zones controlled by each of the plurality of cores; and a wear level manager configured to control the plurality of cores such that a core that is different from a first core controlling a zone corresponding to a memory block group having a highest erase count value from among the plurality of cores controls some of a plurality of zones controlled by the first core according to whether a difference value between the highest erase count value and a lowest erase count value among the erase count values exceeds a threshold difference value.

In accordance with still another aspect of the present disclosure, there is provided a storage device including: a memory device including a plurality of memory blocks allocated to a plurality of zones; and a memory controller including a plurality of cores controlling a plurality of zones, the memory controller changing zones controlled by the plurality of cores, based on reset count values of the plurality of zones.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIGS. 8A to 8C are diagrams illustrating reset information in accordance with an embodiment of the present disclosure.

FIG. 10 is a flowchart illustrating an example of an operating method of a memory controller in accordance with an embodiment of the present disclosure.

DETAILED DESCRIPTION

The specific structural or functional descriptions disclosed herein are merely illustrative for the purpose of describing embodiments according to concepts of the present disclosure. The embodiments according to the concepts of the present disclosure can be implemented in various forms, and are not to be construed as limited to the embodiments set forth herein.

Figure 1:
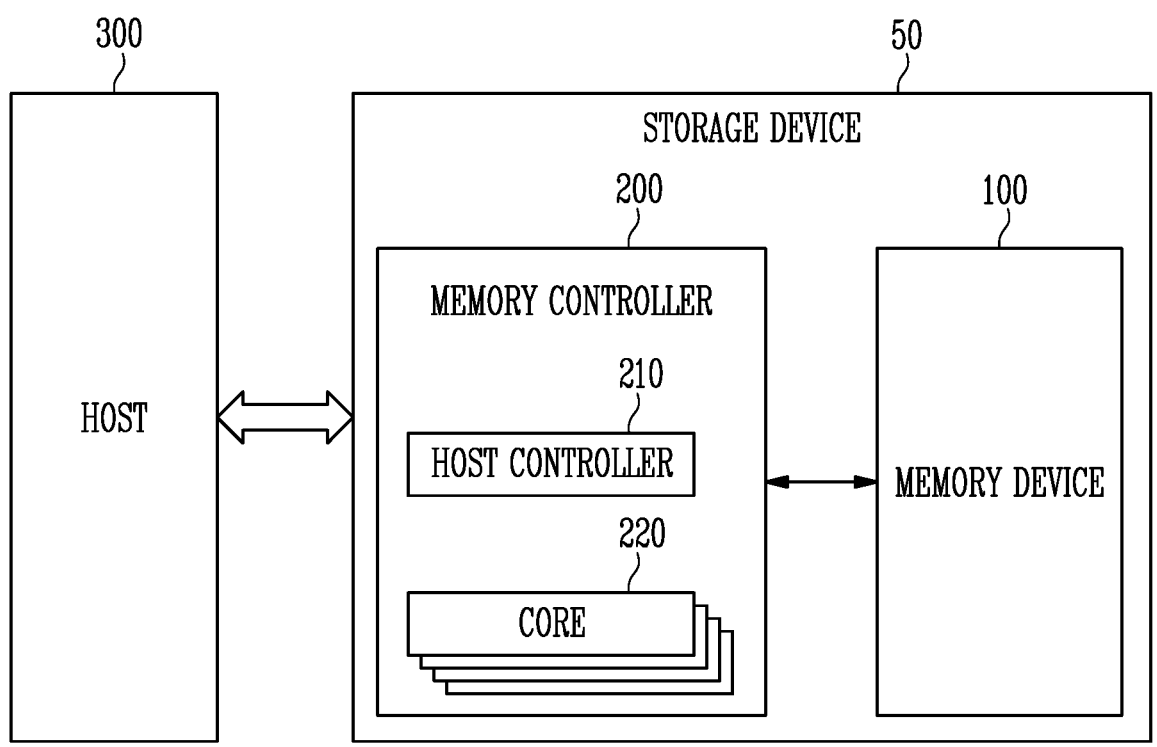
FIG. 1 is a diagram illustrating a storage device in accordance with an embodiment of the present disclosure.

FIG. 1 is a diagram illustrating a storage device in accordance with an embodiment of the present disclosure.

Referring to FIG. 1, a storage device 50 may include a memory device 100 and a memory controller 200 for controlling an operation of the memory device 100. The storage device 50 may be a device for storing data under the control of a host 300, such as a mobile phone, a smart phone, an MP3 player, a laptop computer, a desktop computer, a game console, a TV, a tablet PC or an in-vehicle infotainment system.

The storage device 50 may be manufactured as any one of various types of storage devices according to a host interface that is a communication scheme with the host 300. For example, the storage device 50 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 may operate under the control of the memory controller 200. The memory device 100 may include a memory cell array (not shown) that includes a plurality of memory cells for storing data.

Each of the memory cells may operate as any one of a Single Level Cell (SLC) storing one data bit, a Multi-Level Cell (MLC) storing two data bits, a Triple Level Cell (TLC) storing three data bits, and a Quadruple Level Cell (QLC) storing four data bits.

The memory cell array (not shown) may include a plurality of memory blocks. Each memory block may include a plurality of memory cells. A memory block may include a plurality of pages. In an embodiment, a page may be a unit for storing data in the memory device 100 or reading data stored in the memory device 100. The memory block may be a unit for erasing data.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR) SDRAM, a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, it is assumed that the memory device 100 is a NAND flash memory is assumed and described.

The memory device 100 may receive a command CMD and an address ADDR from the memory controller 200, and access a zone selected by the address ADDR in the memory cell array. The memory device 100 may perform an operation indicated by the command CMD on the zone selected by the address ADDR. For example, the memory device 100 may perform a write operation (program operation), a read operation, or an erase operation. In the program operation, the memory device 100 may program data in the zone selected by the address ADDR. In the read operation, the memory device 100 may read data from the zone selected by the address ADDR. In the erase operation, the memory device 100 may erase data stored in the zone selected by the address ADDR.

The memory controller 200 may control overall operations of the storage device 50.

When power is applied to the storage device 50, the memory controller 200 may execute firmware (FW). When the memory device 100 is a flash memory device, the FW may include a host interface layer (HIL) for controlling communication with the host 300, a flash translation layer (FTL) for controlling communication between the host and the memory device 100, and a flash interface layer (FIL) for controlling communication with the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored. In this specification, the LBA and a "logic address"

or "logical address" may be used with the same meaning. In this specification, the PBA and a "physical address" may be used with the same meaning.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a command, an address, and data regardless of, or independent of, any request from the host 300, and transmit the command, the address, and the data to the memory device 100. For example, the memory controller 200 may provide the memory device 100 with a command, an address, and data, which are used to perform read and program operations that accompany performing of wear leveling, read reclaim, garbage collection, etc.

In an embodiment, the memory controller 200 may control at least two memory devices 100. The memory controller 200 may control the memory devices according to an interleaving technique so as to improve operational performance. The interleaving technique may be a method for controlling operations on at least two memory devices 100 to overlap with each other.

In an embodiment, the memory controller 200 may include a host controller 210 and a plurality of cores 220.

The host controller 210 may drive a host interface layer. For example, the host controller 210 may receive requests and logical addresses corresponding to the requests from the host 300. Also, the host controller 210 may distribute the requests input from the host 300 to the plurality of cores 220, based on the logical addresses.

In an embodiment, the host controller 210 may manage reset information associated with a reset request input from the host 300. The reset information may include reset count values representing a number of a reset request input with respect to a plurality of zones, reset count sum values obtained by summing reset count values of a plurality of zones controlled by each of the plurality of cores 220, and erase count values representing a number of times an erase operation of a plurality of memory block groups configured with a plurality of memory blocks is performed.

The zone may be an area in which data corresponding to consecutive logical addresses input from the host is stored. The zone will be described in detail with reference to FIGS. 4 and 5.

Each of the plurality of cores 220 may control a plurality of zones. For example, each of the plurality of cores 220 may drive a flash translation layer. Each of the plurality of cores 220 may control a plurality of zones according to a request input from the host 300. For example, each of the plurality of cores 220 may control a zone corresponding to logical addresses input from the host 300 to perform an operation corresponding to the request.

Meanwhile, amounts of requests distributed to the respective cores 220 may be different from each other according to the zone for which the request is received from the host 200. Therefore, the request of the host 300 may be excessively input to a specific core from among the plurality of cores 220. Thus, wear levels of the plurality of cores 220 may be different from each other. To address this issue, a plan for equally maintaining wear levels among the plurality of cores 220 equally distributes requests of the host to the plurality of cores 220.

In accordance with an embodiment of the present disclosure, the host controller 210 may change zones controlled by the plurality of cores 220, based on reset count values of the plurality of zones.

A read request provided from the host 300 is a request for requesting the storage device 50 to again provide the host 300 with original data that the host 300 requests to be stored in the storage device 50. The memory controller 200 may generate write data including parity data for error correction by performing error correction encoding on the original data. The memory controller 200 may control the memory device 100 such that the write data is stored in the memory device 100.

Subsequently, in response to the read request of the host 300, the memory controller 200 may provide the memory device 100 with a read command and a physical address representing positions of memory cells in which data to be read is stored so as to acquire data corresponding to the read request of the host 300 from the memory device 100.

The host 300 may communicate with the storage device 50, using at least one of various communication manners, such as for example a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a NonVolatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
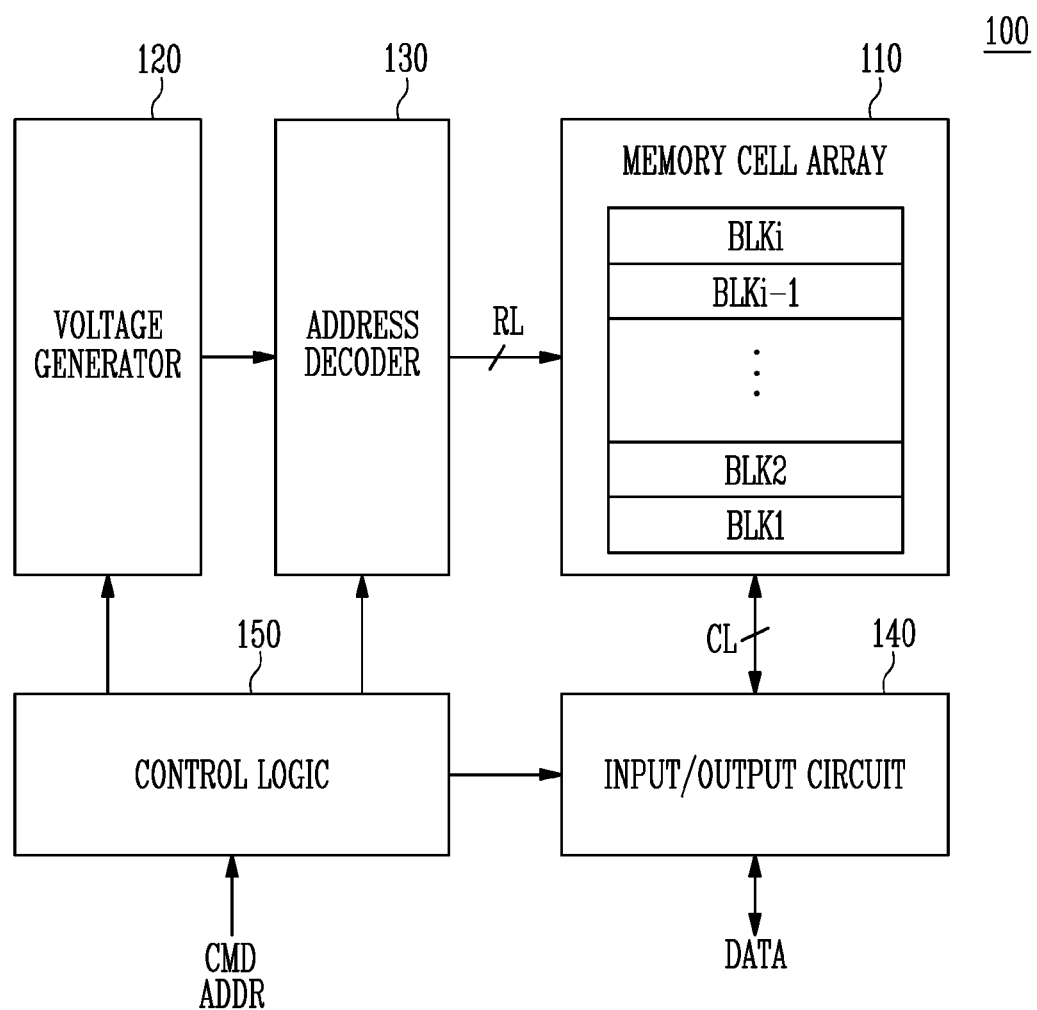
FIG. 2 is a diagram illustrating a memory device shown in FIG. 1.

FIG. 2 is a diagram illustrating a memory device shown in FIG. 1.

Referring to FIG. 2, a memory device 100 may include a memory cell array 110, a voltage generator 120, an address decoder 130, an input/output circuit 140, and a control logic 150.

The memory cell array 110 includes a plurality of memory blocks BLK1 to BLKi (where i is a positive integer). The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line from among the plurality of memory cells may be defined as one physical page. That is, the memory cell array 110 may include a plurality of physical pages. Each of the memory cells of the memory device 100 may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

In an embodiment, the voltage generator 120, the address decoder 130, and the input/output circuit 140 may be collectively referred to as a peripheral circuit. The peripheral circuit may drive the memory cell array 110 under the control of the control logic 150. The peripheral circuit may drive the memory cell array 110 to perform a program operation, a read operation, or an erase operation, for example.

The voltage generator 120 generates a plurality of operation voltages by using an external power voltage supplied to the memory device 100. The voltage generator 120 operates under the control of the control logic 150.

In an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate a plurality of operation voltages by using the external power voltage or the internal power voltage. The voltage generator 120 may generate various voltages required in the memory device 100. For example, the voltage generator 120 may generate a plurality of erase voltages, a plurality of program voltages, a plurality of pass voltages, a plurality of select read voltages, and a plurality of unselect read voltages.

In order to generate a plurality of operation voltages having various voltage levels, the voltage generator 120 may include a plurality of pumping capacitors for receiving the internal power voltage, and generate the plurality of operation voltages by selectively activating the plurality of pumping capacitors under the control of the control logic 150.

The plurality of generated operation voltages may be supplied to the memory cell array 110 by the address decoder 130.

The address decoder 130 is connected to the memory cell array 110 through the row lines RL. The address decoder 130 operates under the control of the control logic 150. The address decoder 130 may receive an address ADDR from the control logic 150. The address decoder 130 may decode a block address in the received address ADDR. The address decoder 130 may select at least one memory block from among the memory blocks BLK1 to BLKi according to the decoded block address. The address decoder 130 may decode a row address in the received address ADDR. The address decoder 130 may select at least one word line from among word lines of the selected memory block according to the decoded row address. In an embodiment, the address decoder 130 may decode a column address in the received address ADDR. The address decoder 130 may connect the input/output circuit 140 and the memory cell array 110 according to the decoded column address.

In accordance with an embodiment of the present disclosure, in a read operation, the address decoder 130 may apply a read voltage to the selected word line, and apply a read pass voltage having a level higher or magnitude greater than that of the read voltage to unselected word lines.

Although not illustrated in FIG. 2, the address decoder 130 may include components such as a row decoder, a column decoder, and an address buffer.

The input/output circuit 140 may include a plurality of page buffers (not illustrated in FIG. 2). The plurality of page buffers may be connected to the memory cell array 110 through column or bit lines. In a program operation, data may be stored in selected memory cells according to the data stored in the plurality of page buffers.

In a read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to a command CMD transferred from an external device. The control logic 150 may control the peripheral circuit by generating various signals in response to the command CMD and the address ADDR.

Figure 3:
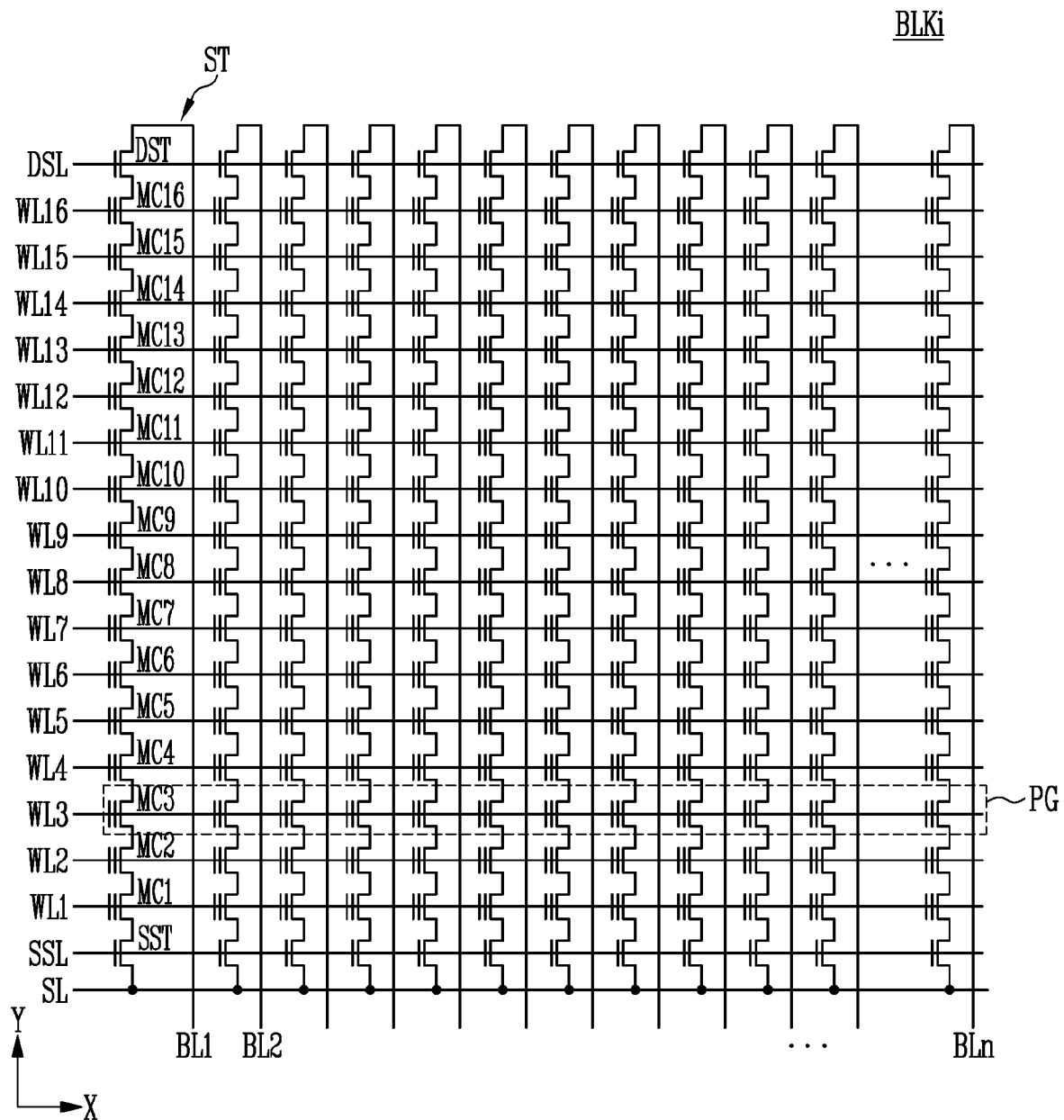
FIG. 3 is a diagram illustrating a structure of any one memory block from among the memory blocks shown in FIG. 2.

FIG. 3 is a diagram illustrating a structure of any one memory block from among the memory blocks shown in FIG. 2.

The memory block BLKi is a diagram illustrating any one memory block BLKi among the memory blocks BLK1 to BLKi shown in FIG. 2.

Referring to FIG. 3, in the memory block BLKi, a plurality of word lines may be arranged in parallel to each other between a first select line and a second select line. The first select line may be a source select line SSL, and the second select line may be a drain select line DSL. More specifically, the memory block BLKi may include a plurality of strings ST connected between bit lines BL1 to BLn (where n is a positive integer) and a source line SL. The bit lines BL1 to BLn may be respectively connected to the strings ST, and the source line SL may be commonly connected to the strings ST. The strings ST may be configured to be identical to one another, and therefore, a string ST connected to a first bit line BL1 will be described in detail as an example.

The string ST may include a source select transistor SST, a plurality of memory cells MC1 to MC16, and a drain select transistor DST, which are connected in series to each other between the source line SL and the first bit line BL1. At least one source select transistor SST and at least one drain select transistor DST may be included in one string ST. In other embodiments, the number of memory cells in a string ST may be greater than that of the memory cells MC1 to MC16 illustrated in FIG. 3.

A source of the source select transistor SST may be connected to the source line SL, and a drain of the drain select transistor DST may be connected to the first bit line BL1. The memory cells MC1 to MC16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells MC1 to MC16 may be connected to a plurality of word lines WL1 to WL16, respectively. A group of memory cells connected to the same word line from among memory cells included in different strings ST may be referred to as a physical page PG. Therefore, a number of physical pages PG corresponding to the number of the word lines WL1 to WL16 may be included in the memory block BLKi.

A memory cell that may store one-bit data is generally referred to as a single level cell (SLC). One physical page PG may store one logical page (LPG) data. One LPG data may include data bits corresponding to the number of cells included in the one physical page PG.

In an embodiment, a memory cell may store two-bit or more-bit data. One physical page PG may store two or more LPG data.

Figure 4:
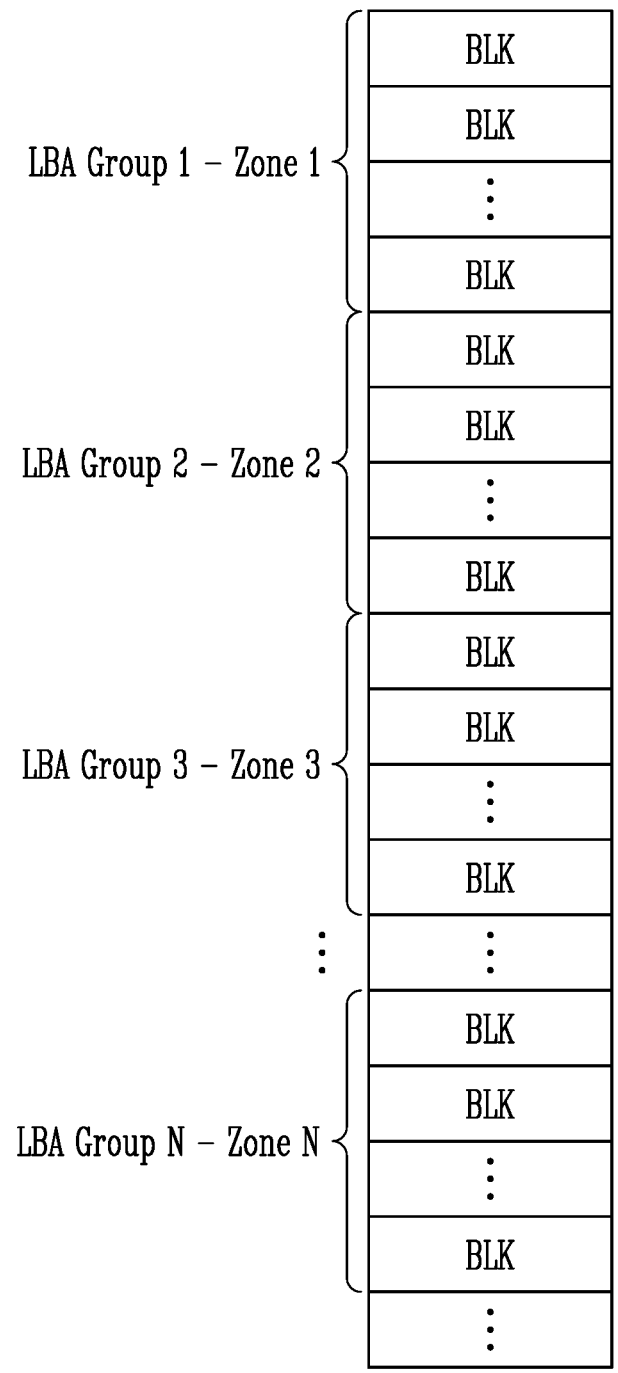
FIG. 4 is a diagram illustrating a concept of a zone in accordance with an embodiment of the present disclosure.

FIG. 4 is a diagram illustrating a concept of a zone in accordance with an embodiment of the present disclosure.

In FIG. 4, a plurality of zones may include first to Nth zones Zone 1 to Zone N (where N is a positive integer). Each of the plurality of zones may include a plurality of memory blocks. The number of memory blocks included in each of the plurality of zones may be different or the same. A zone may be a storage area corresponding to a logical address group configured with logical addresses input from the host.

Specifically, each of the plurality of zones may be an area storing data corresponding to a corresponding logical address group. For example, the first zone Zone 1 may be an area storing data corresponding to a first memory block group LBA Group 1. In addition, the second zone Zone 2 may be an area storing data corresponding to a second memory block group LBA Group 2. In addition, the third zone Zone 3 may be an area storing data corresponding to a third memory block group LBA Group 3. The Nth zone Zone N may be an area storing data corresponding to an Nth memory block group LBA Group N. Each of the logical address groups may include consecutive logical addresses.

Meanwhile, each of the plurality of zones may perform a reset operation according to a reset request input from the host. The reset operation may be an operation of erasing data stored in memory blocks included in a zone that becomes a target of the reset request. For example, when a reset request for the first zone Zone 1 is input, the memory device may perform an erase operation on the memory blocks included in the first zone Zone 1. In addition, when a reset request for the second zone Zone 2 is input, the memory device may perform an erase operation on the memory blocks included in the second zone Zone 2. In addition, when a reset request for the third zone Zone 3 is input, the memory device may perform an erase operation on the memory blocks included in the third zone Zone 3. In addition, when a reset request for the Nth zone Zone N is input, the memory device may perform an erase operation on the memory blocks included in the Nth zone Zone N.

Figure 5:
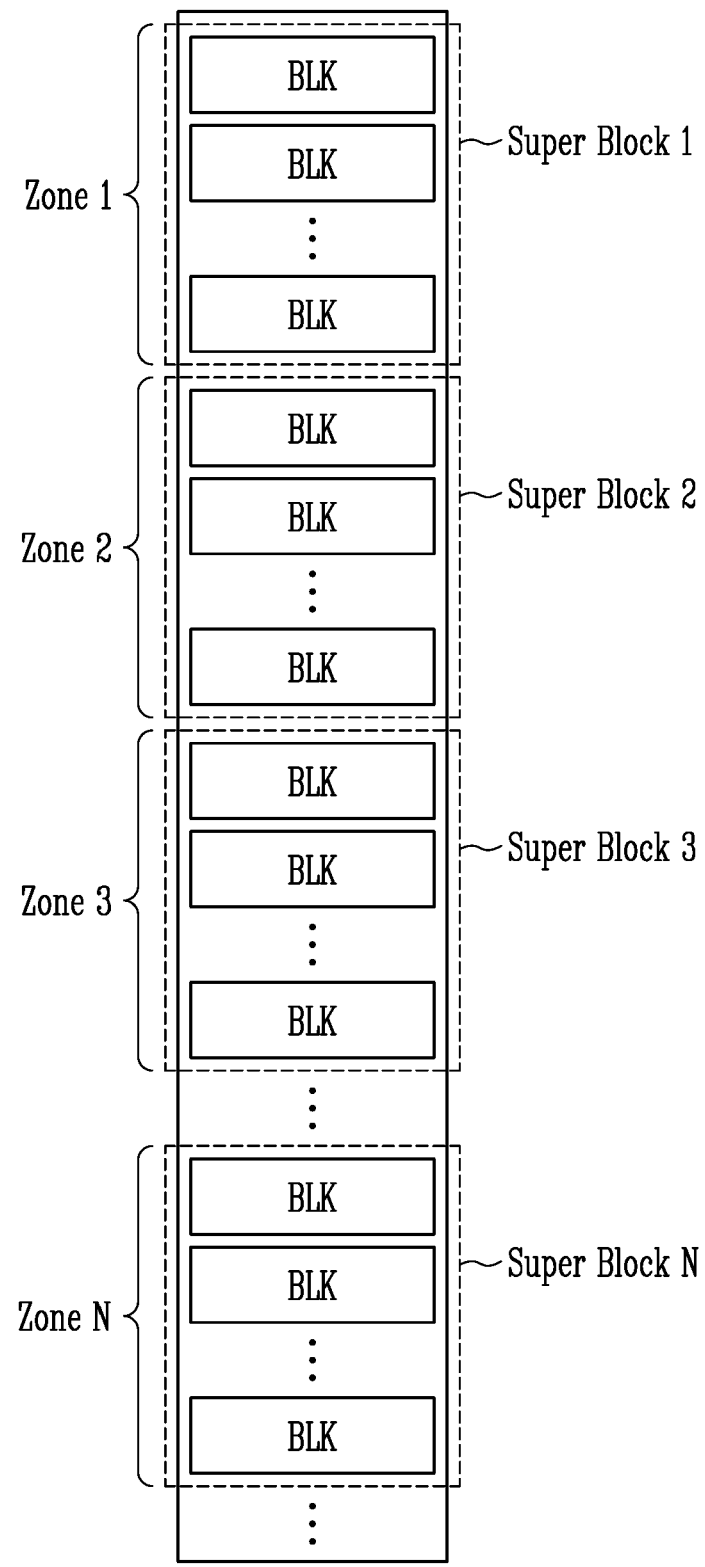
FIG. 5 is a diagram illustrating a relationship between a zone and memory blocks in accordance with an embodiment of the present disclosure.

FIG. 5 is a diagram illustrating a relationship between a zone and memory blocks in accordance with an embodiment of the present disclosure.

In FIG. 5, it is assumed that a memory device includes a plurality of memory blocks.

The plurality of memory blocks may be controlled in a super block unit. For example, a memory controller may store data in the super bock unit. A plurality of super blocks may include first to Nth super blocks Super Block 1 to Super Block N. Each of the plurality of super blocks may be configured with a plurality of memory blocks. In an embodiment, numbers of memory bocks respectively included in super blocks within the plurality of super blocks may be different from or equal to each other.

In an embodiment, a memory block group configured with memory blocks included in one super block may be included in one zone. For example, memory blocks included in a first zone Zone 1 may be included in the first super block Super Block 1. In addition, memory blocks included in a second zone Zone 2 may be included in the second super block Super Block 2. In addition, memory blocks included in a third zone Zone 3 may be included in the third super block Super Block 3. In addition, memory blocks included in an Nth zone Zone N may be included in the Nth super block Super Block N. That is, a plurality of zones may respectively correspond to the plurality of super blocks.

Meanwhile, although a one to one correspondence between one zone and one super block has been described in the above-described example, the present disclosure is not necessarily limited thereto. In other embodiments, the number of super blocks corresponding to one zone may be variously changed.

Figure 6:
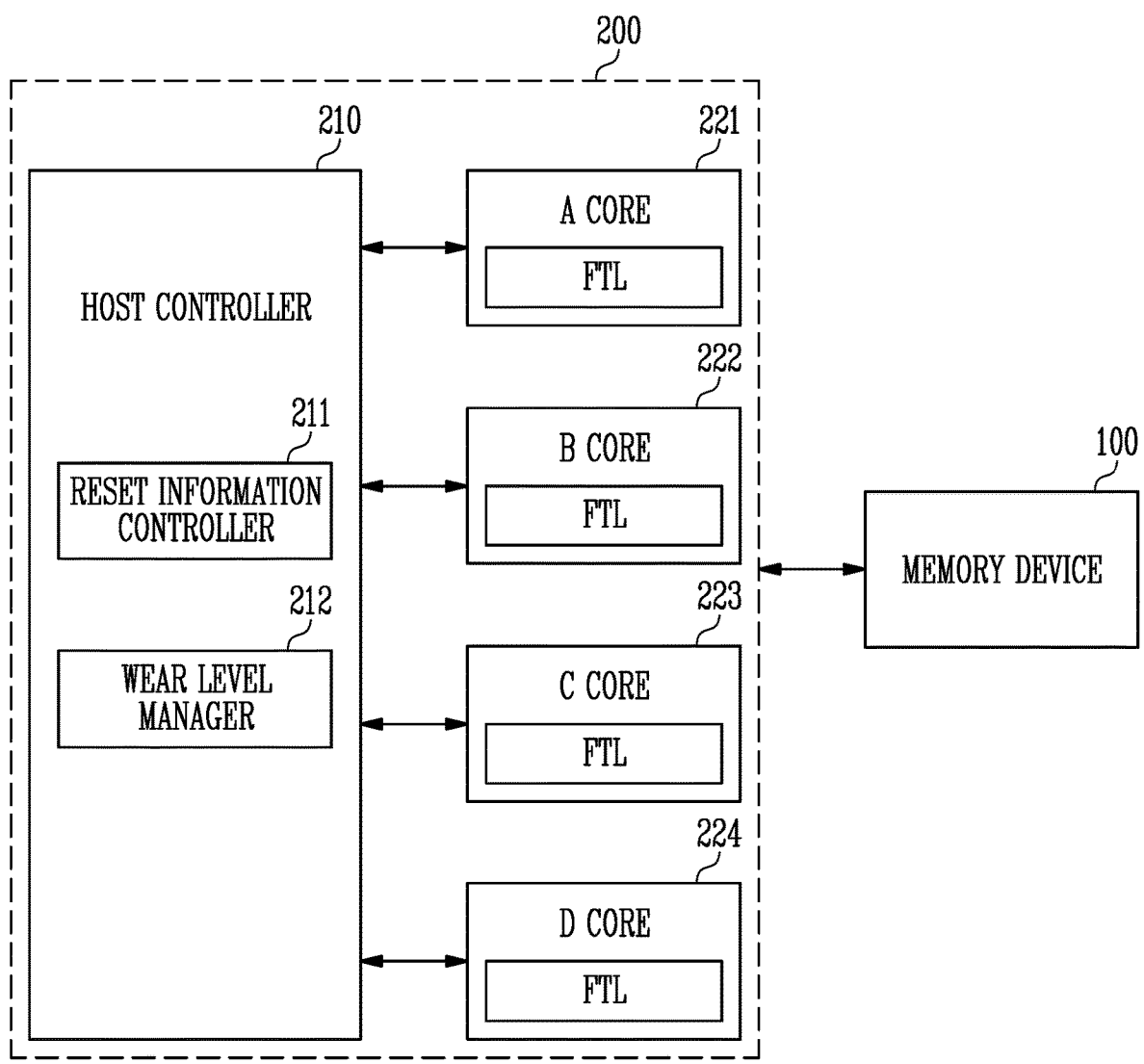
FIG. 6 is a diagram illustrating a memory controller in accordance with an embodiment of the present disclosure.

FIG. 6 is a diagram illustrating a memory controller in accordance with an embodiment of the present disclosure.

Referring to FIG. 6, the memory controller 200 may include a host controller 210 and a plurality of cores 221, 222, 223, and 224.

The host controller 210 may include a reset information controller 211 and a wear level manager 212.

The reset information controller 211 may generate reset information associated with a reset request input from the host 300. In an embodiment, the reset information controller 211 may generate reset count values representing a number of reset requests, which are input with respect to a plurality of zones in response to the reset request input from the host 300. For example, the reset information controller 211 may generate reset count values of the plurality of zones by counting the number of reset requests input with respect to the plurality of zones.

In an embodiment, the reset information controller 211 may generate reset count sum values, which are obtained by summing reset count values of a plurality of zones controlled by each of the plurality of cores 221, 222, 223, and 224. For example, the reset information controller 221 may sum reset count values of the zones controlled by each of the plurality of cores 221, 222, 223, and 224. The reset information controller 211 may generate reset count sum values corresponding to the plurality of cores 221, 222, 223, and 224 through a result obtained by summing the reset count values of the zones controlled by each of the plurality of cores 221, 222, 223, and 224.

In an embodiment, the reset information controller 211 may generate erase count values representing a number of times an erase operation is performed on a plurality of memory block groups. The plurality of memory block groups may be formed in a super block unit. For example, the reset information controller 211 may generate erase count values of a plurality of memory block groups respectively corresponding to the plurality of zones controlled by each of the plurality of cores 221, 222, 223, and 224.

The wear level manager 212 may manage wear levels of the plurality of cores. Specifically, in response to a reset request of the host, the wear level manager 212 may check whether wear levels of the plurality of cores 221, 222, 223, and 223 are even or maintain a constant difference.

In an embodiment, the wear level manager 212 may determine whether the wear levels of the plurality of cores 221, 222, 223, and 224 are equal to each other, based on a result obtained by comparing, with a threshold difference value, the differences in values of the reset count sum values corresponding to the plurality of cores 221, 222, 223, and 223. For example, when a difference value of a highest reset count sum value and a lowest reset count sum value, from among the reset count sum values corresponding to the plurality of cores 221, 222, 223, and 224, exceeds the threshold difference value, the wear level manager 212 may determine that the wear levels of the plurality of cores 221, 222, 223, and 224 are not equal to each other.

Also, in an embodiment, the wear level manager 212 may determine whether the wear levels of the plurality of cores 221, 222, 223, and 224 are equal to each other based on a result obtained by comparing, with a threshold difference value, the difference values of erase count values of the plurality of memory block groups respectively corresponding to the plurality of zones controlled by each of the plurality of cores 221, 222, 223, and 224. For example, when a difference value of a highest erase count value and a lowest erase count value from among the erase count values corresponding to the plurality of cores 221, 222, 223, and 224 exceeds the threshold difference value, the wear level manager 212 may determine that the wear levels of the plurality of cores 221, 222, 223, and 224 are not equal to each other.

When it is determined that the wear levels of the plurality of cores 221, 222, 223, and 224 are not equal to each other, the wear level manager 212 may change the zones controlled by the plurality of cores 221, 222, 223, and 224, based on the reset information. That is, the wear level manager 212 may change the zones controlled by the plurality of cores 221, 222, 223, and 224, based on the reset count values of the plurality of zones.

In an embodiment, the wear level manager 212 may control the plurality of cores 221, 222, 223, and 224 such that another core controls some of a plurality of zones controlled by a largest reset core, which may be a core having a highest reset count sum value from among the plurality of cores 221, 222, 223, and 224. For example, when the difference value of the highest reset count sum value and the lowest reset count sum value exceeds the threshold difference value, the wear level manager 212 may control the plurality of cores 221, 222, 223, and 224 such that a smallest reset core, which may be a core having the lowest reset count sum value among the plurality of cores 221, 222, 223, and 224, controls a largest reset zone, which is a zone having a highest reset count value from among the plurality of zones controlled by the largest reset core.

In an embodiment, the wear level manager 212 may control the plurality of cores 221, 222, 223, and 224 such that another core controls some of a plurality of zones controlled by the smallest reset core, while the smallest reset core controls the largest reset zone from among the zones controlled by the largest reset core. For example, the wear level manager 212 may control the plurality of cores 221, 222, 223, and 224 such that the largest reset core controls a smallest reset zone, which may be a zone having a lowest reset count value among the zones controlled by the smallest reset core, while the smallest reset core controls the largest reset zone from among the zones controlled by the largest reset core. In other words, when the difference value between the highest reset count sum value and the lowest reset count sum value exceeds the threshold difference value, the wear level manager 212 may control the largest reset core and the smallest reset core such that the largest reset core controls the smallest reset zone controlled by the smallest reset core and the smallest reset core controls the largest reset zone controlled by the largest reset core. Consequently, the difference of the reset count sum values between the largest reset core and the smallest reset core may be decreased to the threshold difference value or less.

Similarly, in other embodiments, the wear level manager 212 may control the plurality of cores 221, 222, 223, and 224 such that another core controls some of a plurality of zones controlled by a largest erase core, which may be a core controlling a zone corresponding to a memory block group having a highest erase count value from among the plurality of cores 221, 222, 223, and 224. For example, when the difference value of the highest erase count value and a lowest erase count value exceeds a threshold difference value, the wear level manager 212 may control the plurality of cores 221, 222, 223, and 224 such that a smallest erase core, which may be a core controlling a zone corresponding to a memory block group having the lowest erase count value among the plurality of cores 221, 222, 223, and 224, controls a largest reset zone from among a plurality of zones controlled by the largest erase core.

In an embodiment, the wear level manager 212 may control the plurality of cores 221, 222, 223, and 224 such that another core controls some of the zones controlled by the smallest erase core while the smallest erase core controls a largest reset zone from among the zones controlled by the largest erase core. For example, the wear level manager 212 may control the plurality of cores 221, 222, 223, and 224 such that the largest erase core controls a smallest reset zone from among the zones controlled by the smallest erase core, while the smallest erase core controls the largest reset zone from among the zones controlled by the largest erase core. In other words, when the difference value between the highest erase count value and the lowest erase count value exceeds the threshold difference value, the wear level manager 212 may control the largest erase core and the smallest erase core such that the largest erase core controls the smallest reset zone controlled by the smallest erase core and the smallest erase core controls the largest reset zone controlled by the largest erase core.

Accordingly, the wear level manager 212 changes the zones controlled by the plurality of cores 221, 222, 223, and 224, based on reset count values or erase count values of a plurality of zones, to manage the plurality of cores 221, 222, 223, and 224 such that the wear levels of the plurality of cores 221, 222, 223, and 224 can be equalized.

Meanwhile, in an embodiment, the largest reset core or the largest erase core may be designated as a hot core, and the smallest reset core or the smallest erase core may be designated as a cold core. In addition, the largest reset zone may be designated as a hot zone, and the smallest reset zone may be designated as a cold zone.

The plurality of cores 221, 222, 223, and 224 may include an A core, a B core, a C core, and a D core. Although FIG. 6 illustrates four cores, the number of cores may be variously changed in other embodiments.

In an embodiment, the plurality of cores 221, 222, 223, and 224 may operate in parallel. Also, each of the plurality of cores 221, 222, 223, and 224 may drive a flash translation layer.

Meanwhile, the memory device 100 may represent one package, and include a plurality of memory chips. Each of the plurality of cores 221, 222, 223, and 224 may be associated with any one memory chip from among the plurality of memory chips. Each of the plurality of cores 221, 222, 223, and 224 may control memory blocks included in the associated memory chip or zones included in the corresponding memory blocks.

Although not illustrated in FIG. 6, the memory device 100 may be provided in plurality. Each of the plurality of cores 221, 222, 223, and 224 may be associated with any one memory device from among a plurality of memory devices. Each of the plurality of cores 221, 222, 223, and 224 may control memory blocks included in the associated memory device or zones included in the corresponding memory blocks.

Specifically, the plurality of cores 221, 222, 223, and 224 may exchange some of a plurality of currently controlled zones under the control of the wear level manager 212.

In an embodiment, the wear level manager 212 may exchange a largest reset zone from among a plurality of zones controlled by a largest reset core with a smallest reset zone from among a plurality of zones controlled by a smallest reset core. For example, the largest reset core from among the plurality of cores may control the smallest reset zone controlled by the smallest reset core. In addition, the smallest reset core among the plurality of cores may control the largest reset zone controlled by the largest reset core.

Also, in an embodiment, the wear level manager 212 may exchange a largest reset zone from among a plurality of zones controlled by a largest erase core with a smallest reset zone from among a plurality of zones controlled by a smallest erase core. For example, the largest erase core from among the plurality of cores may control the smallest reset zone controlled by the smallest erase core. In addition, the smallest erase core from among the plurality of cores may control the largest reset zone controlled by the largest erase core.

In an embodiment, the largest reset core and the smallest reset core from among the plurality of cores 221, 222, 223, and 224 may control the memory device 100 such that data corresponding to the largest reset zone controlled by the largest reset core is moved to memory blocks allocated to a zone newly generated by the smallest reset core. Also, the largest reset core and the smallest reset core may control the memory device 100 such that data corresponding to the smallest reset zone controlled by the smallest reset core is moved to memory blocks allocated to a zone newly generated by the largest reset core.

Also, in an embodiment, the largest erase core and the smallest erase core from among the plurality of cores 221, 222, 223, and 224 may control the memory device 100 such that data corresponding to the largest reset zone controlled by the largest erase core is moved to memory blocks allocated to a zone newly generated by the smallest erase core. Also, the largest erase core and the smallest erase core may control the memory device 100 such that data corresponding to the smallest reset zone controlled by the smallest erase core is moved to memory blocks allocated to a zone newly generated by the largest erase core.

An operation of changing the zones controlled by the plurality of cores 221, 222, 223, and 224 will be described in detail with reference to FIGS. 9A to 9C.

Figure 7:
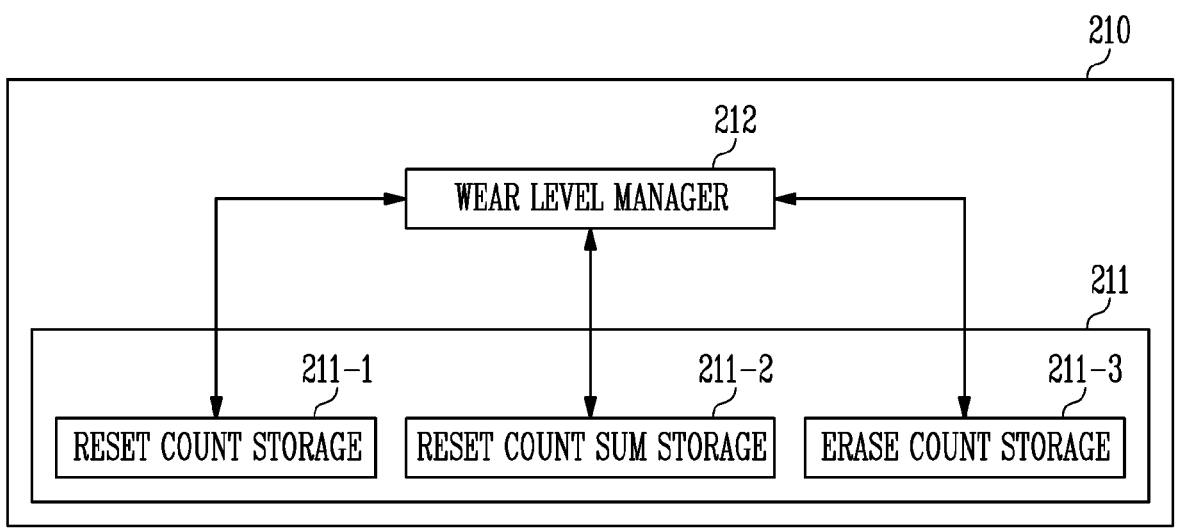
FIG. 7 is a diagram illustrating a host controller shown in FIG. 6.

FIG. 7 is a diagram illustrating a host controller shown in FIG. 6.

Referring to FIG. 7, a host controller 210 includes a wear level manager 212 and a reset information controller 211.

The reset information controller 211 may manage reset information associated with a reset request input from the host 300. The wear level manager 212 may control wear levels of the plurality of cores 221, 222, 223, and 224, based on reset information generated by the reset information controller 211.

The reset information controller 211 may include a reset count storage 211-1, a reset count sum storage 211-2, and an erase count storage 211-3.

The reset count storage 211-1 may store reset count values of a plurality of zones.

The reset count sum storage 211-2 may store reset count sum values obtained by summing reset count values of a plurality of zones controlled by each of the plurality of cores 221, 222, 223, and 224.

The erase count storage 211-3 may store erase count values of a plurality of memory block groups corresponding to each of the plurality of zones.

The reset count value, the reset count sum value, and the erase count value will be described in detail with reference to FIGS. 8A to 8C.

Figure 8A:
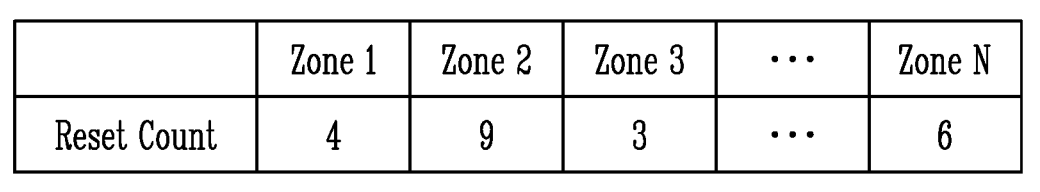
Figure 8C:
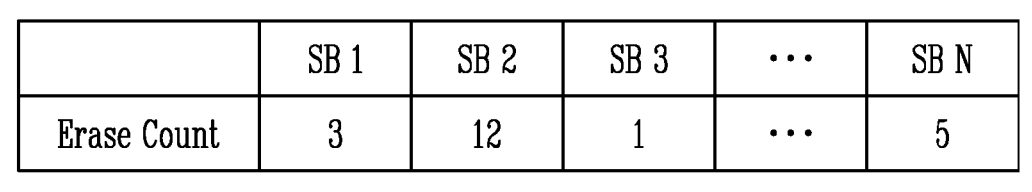

FIGS. 8A to 8C are diagrams illustrating reset information in accordance with an embodiment of the present disclosure.

Specifically, FIG. 8A is a diagram illustrating a reset count value in accordance with an embodiment of the present disclosure. FIG. 8B is a diagram illustrating a reset count sum value in accordance with an embodiment of the present disclosure. FIG. 8C is a diagram illustrating an erase count value in accordance with an embodiment of the present disclosure.

Referring to FIG. 8A, the reset count storage 211-1 may store reset count values of a plurality of zones. In FIG. 8A, it is assumed that the plurality of zones includes first to Nth zones Zone 1 to Zone N.

For example, whenever a reset request for the plurality of zones is received from the host 300, the reset count storage 211-1 may update reset count values of the plurality of zones. The reset count values of the plurality of zones may be different from each other according to a number of reset requests received from the host 300 for each zone.

Referring to FIG. 8B, the reset count sum storage 211-2 may store reset count sum values obtained by summing reset count values of a plurality of zones controlled by each of the plurality of cores 221, 222, 223, and 224.

For example, when the A core 221 controls a first zone Zone 1, a fifth zone Zone 5, a ninth zone Zone 9, a thirteenth zone Zone 13, and a seventeenth zone Zone 17, a reset count sum value of the A core 221 may be a value obtained by summing reset count values of the first zone Zone 1, the fifth zone Zone 5, the ninth zone Zone 9, the thirteenth zone Zone 13, and the seventeenth zone Zone 17.

In addition, when the B core 222 controls a second zone Zone 2, a sixth zone Zone 6, a tenth zone Zone 10, a fourteenth zone Zone 14, and an eighteenth zone Zone 18, a reset count sum value of the B core 222 may be a value obtained by summing reset count values of the second zone Zone 2, the sixth zone Zone 6, the tenth zone Zone 10, the fourteenth zone Zone 14, and the eighteenth zone Zone 18.

In addition, when the C core 223 controls a third zone Zone 3, a seventh zone Zone 7, an eleventh zone Zone 11, a fifteenth zone Zone 15, and a nineteenth zone Zone 19, a reset count sum value of the C core 223 may be a value obtained by summing reset count values of the third zone Zone 3, the seventh zone Zone 7, the eleventh zone Zone 11, the fifteenth zone Zone 15, and the nineteenth zone Zone 19.

In addition, when the D core 224 controls a fourth zone Zone 4, an eighth zone Zone 8, a twelfth zone Zone 12, a sixteenth zone Zone 16, and a twentieth zone Zone 20, a reset count sum value of the D core 224 may be a value obtained by summing reset count values of the fourth zone Zone 4, the eighth zone Zone 8, the twelfth zone Zone 12, the sixteenth zone Zone 16, and the twentieth zone Zone 20.

Meanwhile, the reset count sum values may be used to manage the wear levels of the plurality of cores 221, 222, 223, and 224. For example, it is assumed that a threshold difference value for comparing the reset count sum values is 10, that the B core 222 has 68 as a highest reset count sum value, and that the C core 223 has 46 as a lowest reset count sum value. Because the difference value between the reset count sum value of the B core 222 and the reset count sum value of the C core 223 exceeds the threshold difference value of 10, the wear level manager 212 may control the B core 222 and the C core 223 to change zones controlled by the B core 222 and the C core 223.

Referring to FIG. 8C, the erase count storage 211-3 may store erase count values of a plurality of memory block groups respectively corresponding to the plurality of zones. In FIG. 8C, it is assumed that the plurality of memory block groups are respectively configured as super blocks, and that the plurality of super blocks include first to Nth super blocks SB 1 to SB N.

For example, when an erase operation is performed on memory blocks included in a zone that becomes the target of a reset request received from the host 300 according to the reset request, the erase count storage 211-3 may update an erase count value of a memory block group configured with the corresponding memory blocks. That is, the erase count storage 211-3 may update an erase count value of a super block including the memory blocks on which the erase operation is performed.

Meanwhile, the erase count values may be used to manage the wear levels of the plurality of cores 221, 222, 223, and 224. For example, it is assumed that a threshold difference value for comparing the erase count values is 10, that the B core 222 controls a zone corresponding to a second super block SB 2, and that the C core 223 controls a zone corresponding to a third super bock SB 3. Because the difference value between an erase count value of the second super block SB 2 and an erase count value of the third super block SB 3 exceeds the threshold difference value of 10, the wear level manager 212 may control the B core 222 and the C core 223 to change the zones controlled by the B core 222 and the C core 223.

Figure 9A:
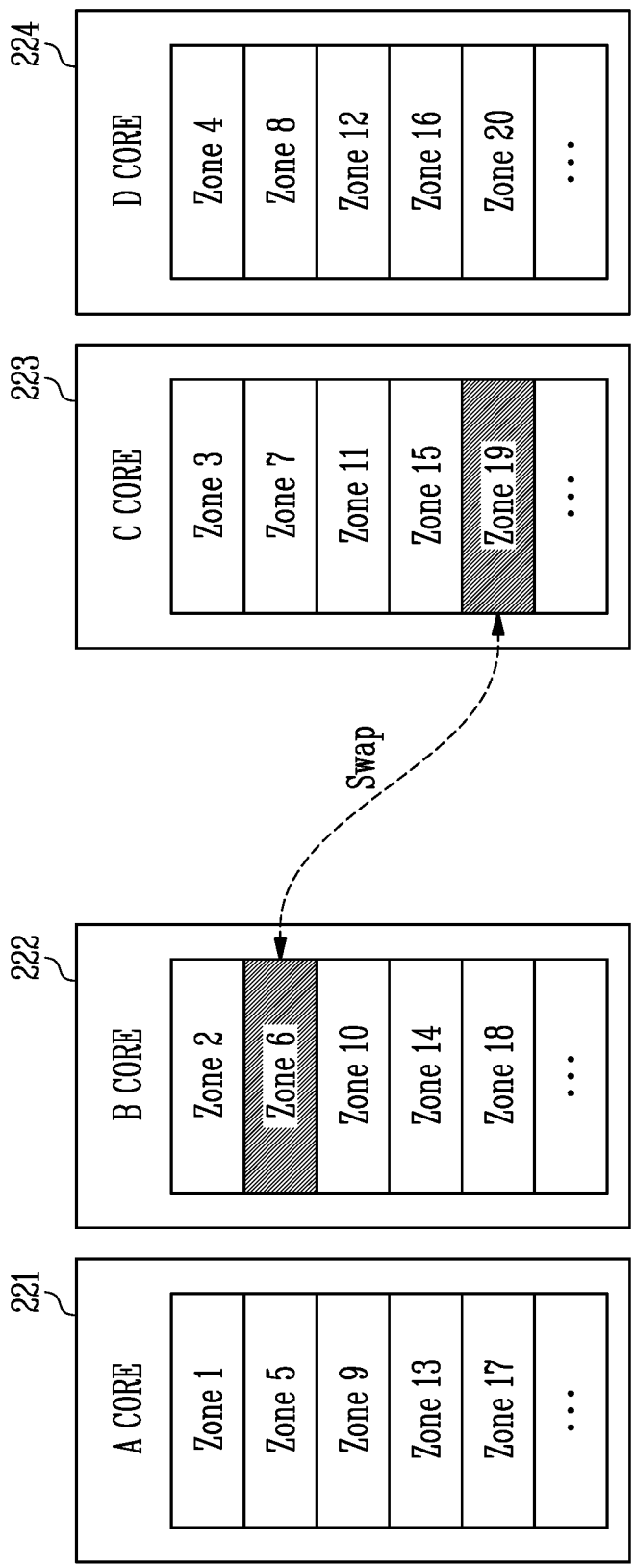
FIGS. 9A to 9C are diagrams illustrating an operation of changing zones controlled by a plurality of cores in accordance with an embodiment of the present disclosure.
Figure 9B:
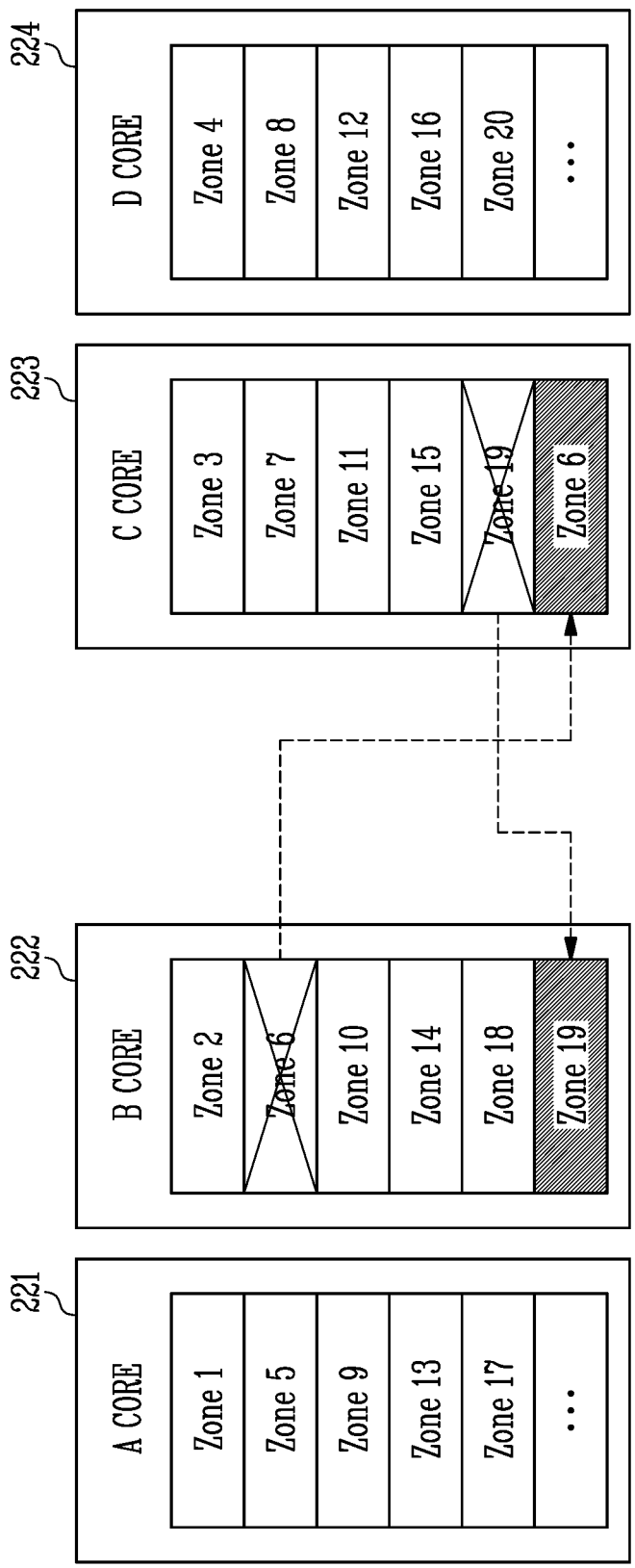
Figure 9C:
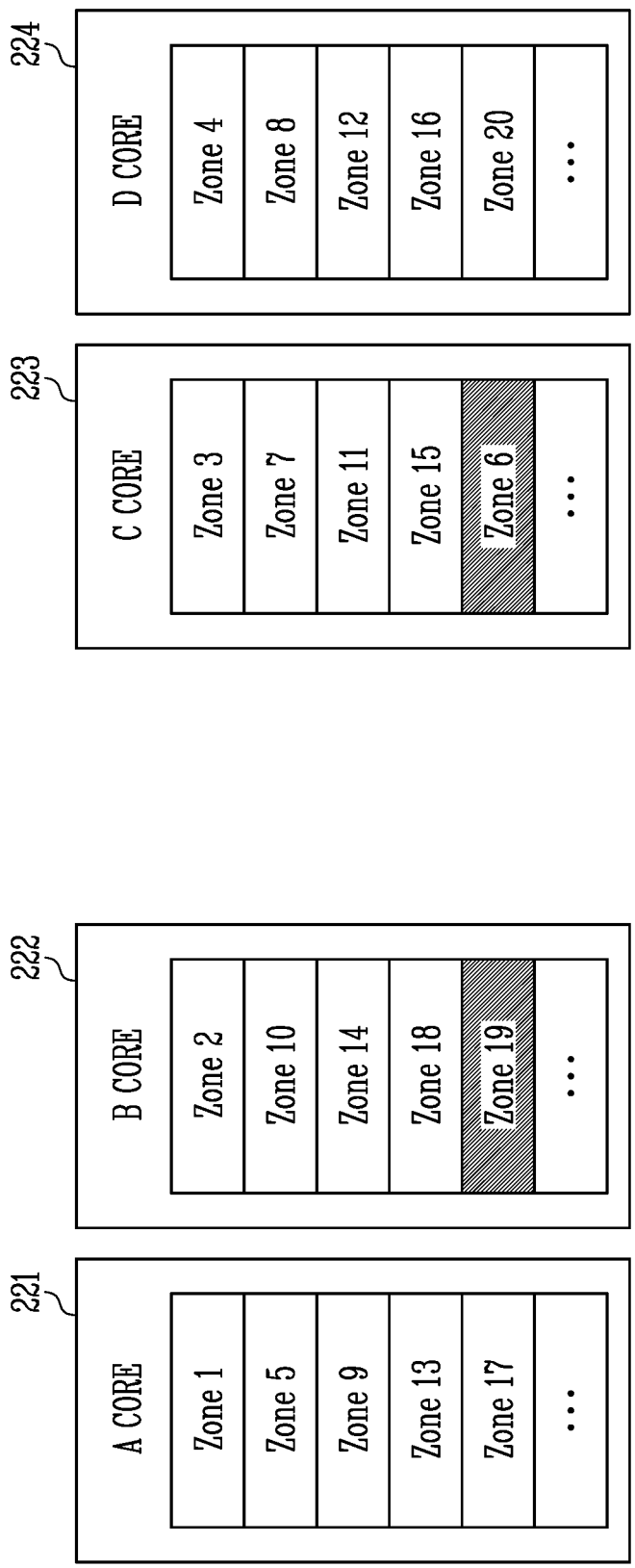

FIGS. 9A to 9C are diagrams illustrating an operation of changing zones controlled by a plurality of cores in accordance with an embodiment of the present disclosure.

In FIGS. 9A to 9C, it is assumed that the A core 221 controls the first zone Zone 1, the fifth zone Zone 5, the ninth zone Zone 9, the thirteenth zone Zone 13, and the seventeenth zone Zone 17; that the B core 222 controls the second zone Zone 2, the sixth zone Zone 6, the tenth zone Zone 10, the fourteenth zone Zone 14, and the eighteenth zone Zone 18; that the C core 223 controls the third zone Zone 3, the seventh zone Zone 7, the eleventh zone Zone 11, the fifteenth zone Zone 15, and the nineteenth zone Zone 19; and that the D core 224 controls the fourth zone Zone 4, the eighth zone Zone 8, the twelfth zone Zone 12, the sixteenth zone Zone 16, and the twentieth zone Zone 20.

Referring to FIG. 9A, when a difference of a highest reset count sum value and a lowest reset count sum value, from among the reset count sum values of the plurality of cores 221, 222, 223, and 224, exceeds the threshold difference value, the wear level manager 212 may control the plurality of cores 221, 222, 223, and 224 to manage zones controlled by the plurality of cores 221, 222, 223, and 224.

For example, it is assumed that the B core 222 is a largest reset core having the highest reset count sum value, and that the C core 223 is a smallest reset core having the lowest reset count sum value. In addition, it is assumed that the sixth zone Zone 6 from among the zones controlled by the B core 222 is a largest reset zone, and that the nineteenth zone Zone 19 from among the zones controlled by the C core 223 is a smallest reset zone.

The wear level manager 212 may control the B core 222 and the C core 223 to change zones controlled by the B core 222 and the C core 223. Specifically, the wear level manager 212 may control the B core 222 and the C core 223 such that the B core 222 controls the nineteenth zone Zone 19 and the C core 223 controls the sixth zone Zone 6.

Next, referring to FIG. 9B, each of the B core 222 and the C core 223 may allocate a zone to extra memory blocks that are not allocated to any zone from among memory blocks included in a memory device associated therewith. For example, the B core 222 may allocate the nineteenth zone Zone 19 to extra memory blocks included in a memory device associated therewith. In addition, the C core 223 may allocate the sixth zone Zone 6 to extra memory blocks included in a memory device associated therewith.

Subsequently, the B core 222 and the C core 223 may control the memory device including memory blocks allocated to a sixth zone Zone 6 newly generated by the C core 223 such that data corresponding to the sixth zone Zone 6 of B core 222 is moved to the corresponding memory blocks. Also, the B core 222 and the C core 223 may control the memory device including memory blocks allocated to a nineteenth zone Zone 19 newly generated by the B core 222 such that data corresponding to the nineteenth zone Zone 19 of C core 223 is moved to the corresponding memory blocks.

Subsequently, the B core 222 may control the memory device to change the previously controlled sixth zone to be in an invalid state, and the C core 223 may control the memory device to change the previously controlled nineteenth zone to be in the invalid state.

Referring to FIG. 9C, according to a reset request for the sixth zone Zone 6 of the B core 222, which is changed to be in the invalid state, and the nineteenth zone Zone 19 of the C core 223, which is changed to be in the invalid state, the B core 222 and the C core 223 may control the memory devices to perform a reset operation respectively on the sixth zone Zone 6 of the B core 222 and the nineteenth zone Zone 19 of the C core 223, which are changed to be in the invalid state.

Subsequently, when a request for the nineteenth zone Zone 19 is input from the host 300, the host controller 210 may provide the request for the nineteenth zone Zone 19 to the B core 222. In addition, when a request for the sixth zone Zone 6 is input from the host 300, the host controller 210 may provide the request for the sixth zone Zone 6 to the C core 223.

Although an operation of changing zones between a largest reset core and a smallest reset core has been described in the above-described example, an operation identical to that of changing the zones between the largest reset core and the smallest reset core may be applied, for example, when zones between a largest erase core and a smallest erase core are changed.

FIG. 10 is a flowchart illustrating an example of an operating method of a memory controller in accordance with an embodiment of the present disclosure.

The operating method shown in FIG. 10 may be performed by, for example, the memory controller 200 shown in FIG. 6.

Referring to FIG. 10, in step S1001, the memory controller 200 may generate reset count values of a plurality of zones in response to a reset request input from the host 300.

In step S1003, the memory controller 200 may generate reset count sum values respectively corresponding to a plurality of cores.

In step S1005, the memory controller 200 may determine whether a difference value between a highest reset count sum value and a lowest reset count sum value from among the reset count sum values of the plurality of cores exceeds a threshold difference value.

When the difference value between the highest reset count sum value and the lowest reset count sum value is the threshold difference value or less, based on a determination result in the step S1005, the memory controller 200 may end the step without changing zones controlled by the plurality of cores.

Alternatively, when the difference value between the highest reset count sum value and the lowest reset count sum value exceeds the threshold difference value, based on a determination result in the step S1005, in step S1007, the memory controller 200 may change zones controlled by the plurality of cores, based on the reset count values of the plurality of zones.

A method for changing zones controlled by a plurality of cores will be described in detail with reference to FIG. 12.

Figure 11:
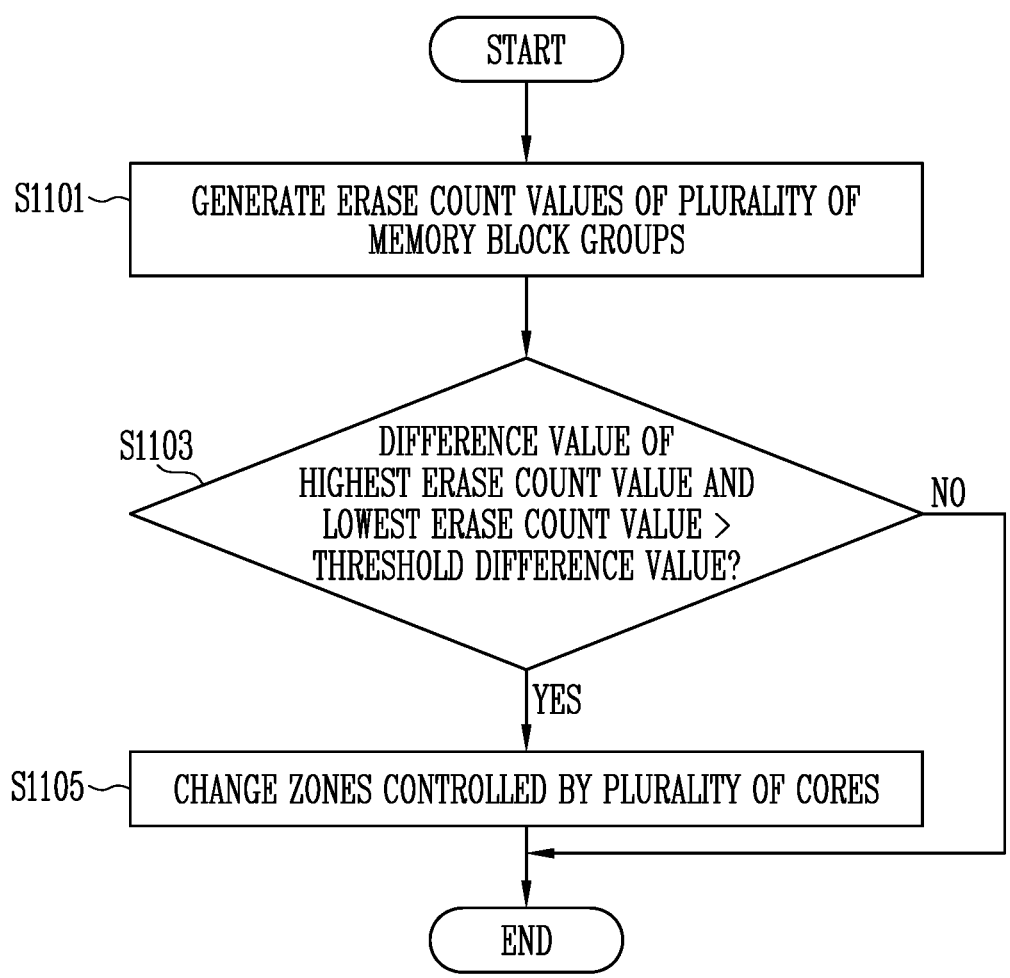
FIG. 11 is a flowchart illustrating another example of an operating method of a memory controller in accordance with an embodiment of the present disclosure.

FIG. 11 is a flowchart illustrating another example of an operating method of a memory controller in accordance with an embodiment of the present disclosure.

The operating method shown in FIG. 11 may be performed by, for example, the memory controller 200 shown in FIG. 6.

Referring to FIG. 11, in step S1101, the memory controller 200 may generate erase count values of a plurality of memory block groups respectively corresponding to a plurality of zones in response to a reset request input from the host 300.

In step S1103, the memory controller 200 may determine whether a difference value between a highest erase count value and a lowest erase count value from among the erase count values of the plurality of memory block groups exceeds a threshold difference value.

When the difference value of the highest erase count value and the lowest erase count value is the threshold difference value or less, based on a determination result in the step S1103, the memory controller 200 may end the step without changing zones controlled by the plurality of cores.

Alternatively, when the difference value of the highest erase count value and the lowest erase count value exceeds the threshold difference value, based on a determination result in the step S1103, in step S1105, the memory controller 200 may change zones controlled by the plurality of cores, based on the erase count values of the plurality of zones.

A method for changing zones controlled by a plurality of cores will be described in detail with reference to FIG. 12.

Figure 12:
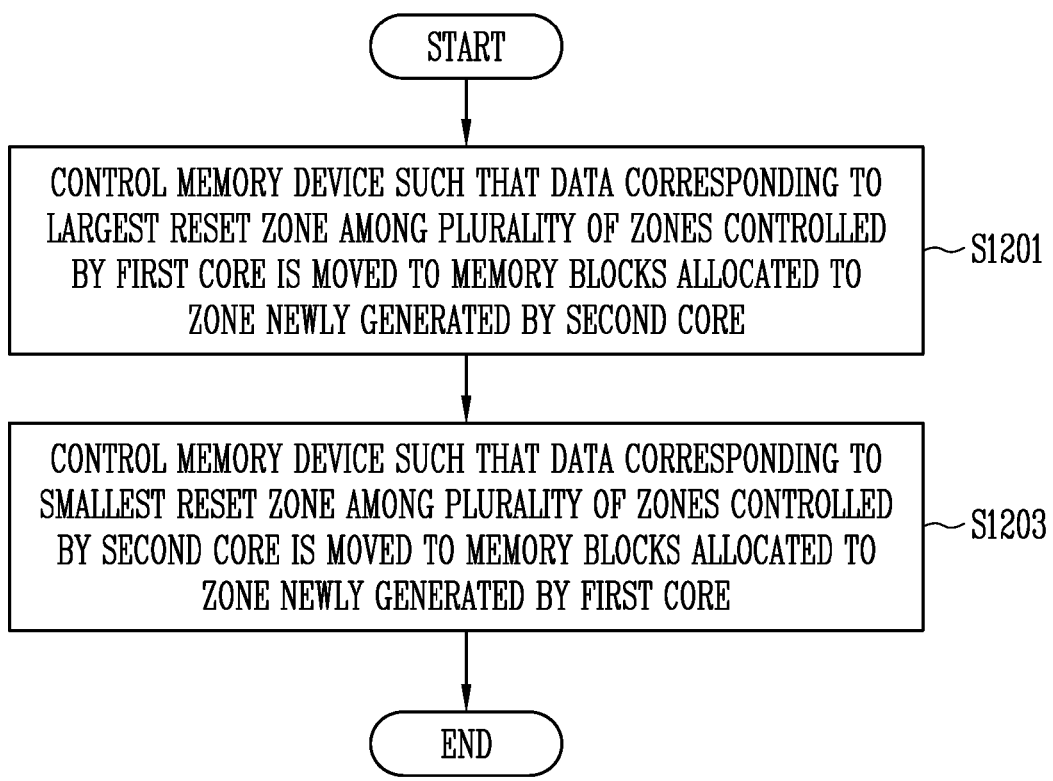
FIG. 12 is a flowchart illustrating a method for changing zones controlled by a plurality of cores in accordance with an embodiment of the present disclosure.

FIG. 12 is a flowchart illustrating a method for changing zones controlled by a plurality of cores in accordance with an embodiment of the present disclosure.

Specifically, the method shown in FIG. 12 may be a diagram illustrating in detail the step S1007 shown in FIG. 10 and the step S1105 shown in FIG. 11.

The method shown in FIG. 12 may be performed by, for example, the memory controller 200 shown in FIG. 6.

Referring to FIG. 12, in step S1201, the memory controller 200 may control the memory device 100 such that data corresponding to a largest reset zone from among a plurality of zones controlled by a first core from among a plurality of cores is moved to memory blocks allocated to a zone newly generated by a second core from among the plurality of cores. The first core may be a largest reset core or a largest erase core. In addition, the second core may be a smallest reset core or a smallest erase core. That is, when the first core is the largest reset core, the second core may be the smallest reset core. In addition, when the first core is the largest erase core, the second core may be the smallest erase core.

Specifically, the memory controller 200 may newly generate a zone controlled by the second core, and allocate memory blocks to the newly generated zone. Subsequently, the memory controller 200 may control the memory device 100 such that data corresponding to the largest reset zone controlled by the first core is moved to the memory blocks allocated to the zone generated by the second core.

In step S1203, the memory controller 200 may control the memory device 100 such that data corresponding to a smallest reset zone, from among a plurality of zones controlled by the second core, which is in turn from among the plurality of cores, is moved to memory blocks allocated to a zone newly generated by the first core among the plurality of cores.

Specifically, the memory controller 200 may newly generate a zone controlled by the first core, and allocate memory blocks to the newly generated zone. Subsequently, the memory controller 200 may control the memory device 100 such that data corresponding to the smallest reset zone controlled by the second core is moved to the memory blocks allocated to the zone generated by the first core.

Figure 13:
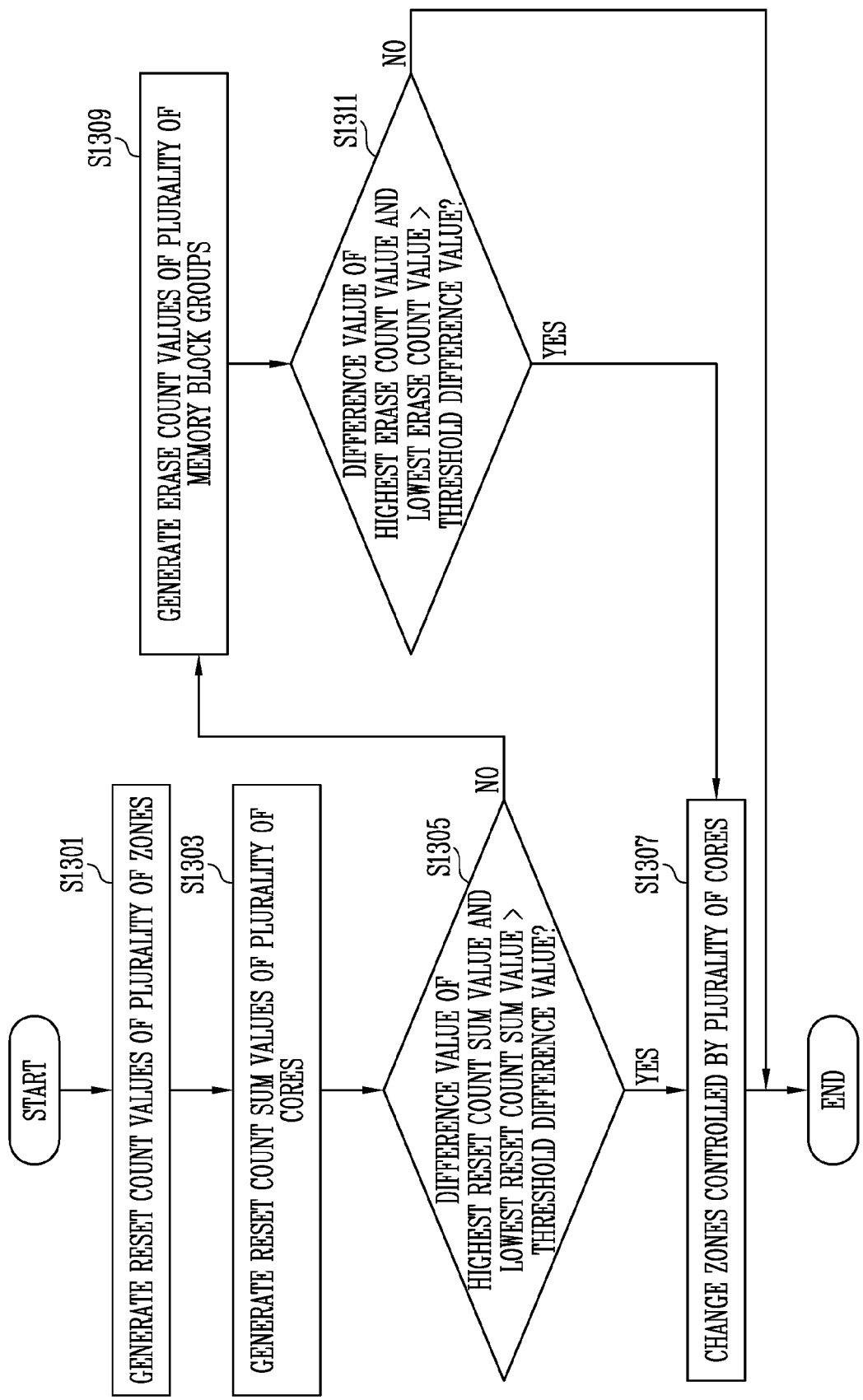
FIG. 13 is a flowchart illustrating still another example of an operating method of a memory controller in accordance with an embodiment of the present disclosure.

FIG. 13 is a flowchart illustrating still another example of an operating method of a memory controller in accordance with an embodiment of the present disclosure.

The operating method shown in FIG. 13 may be a method including a first process of determining whether wear levels of a plurality of cores are equally maintained based on reset count values of a plurality of zones, and a second process of determining whether the wear levels of the plurality of cores are equally maintained based on erase count values of a plurality of memory block groups respectively corresponding to the plurality of zones.

The operating method shown in FIG. 13 may be performed by, for example, the memory controller 200 shown in FIG. 6.

Referring to FIG. 13, in step S1301, the memory controller 200 may generate reset count values of a plurality of zones in response to a reset request input from the host 300.

In step S1303, the memory controller 200 may generate reset count sum values respectively corresponding to a plurality of cores.

In step S1305, the memory controller 200 may determine whether a difference value between a highest reset count sum value and a lowest reset count sum value from among the reset count sum values of the plurality of cores exceeds a threshold difference value.

When the difference value of the highest reset count sum value and the lowest reset count sum value exceeds the threshold difference value, based on a determination result in the step S1305, in step S1307, the memory controller 200 may change zones controlled by the plurality of cores, based on the reset count values of the plurality of zones.

Alternatively, when the difference value of the highest reset count sum value and the lowest reset count sum value is the threshold difference value or less, based on a determination result in the step S1305, in step S1309, the memory controller 200 may generate erase count values of a plurality of memory block groups respectively corresponding to the plurality of zones.

In step S1311, the memory controller 200 may determine whether a difference value between a highest erase count value and a lowest erase count value from among the erase count values of the plurality of memory block groups exceeds a threshold difference value.

When the difference value of the highest erase count value and the lowest erase count value is the threshold difference value or less, based on a determination result in step S1311, the memory controller 200 may end the step without changing the zones controlled by the plurality of cores.

Alternatively, when the difference value of the highest erase count value and the lowest erase count value exceeds the threshold difference value, based on a determination result in step S1311, in the step S1307, the memory controller 200 may change the zones controlled by the plurality of cores, based on the reset count values of the plurality of zones. Meanwhile, the method for changing the zones controlled by the plurality of cores has been described in detail with reference to FIG. 12.

Figure 14:
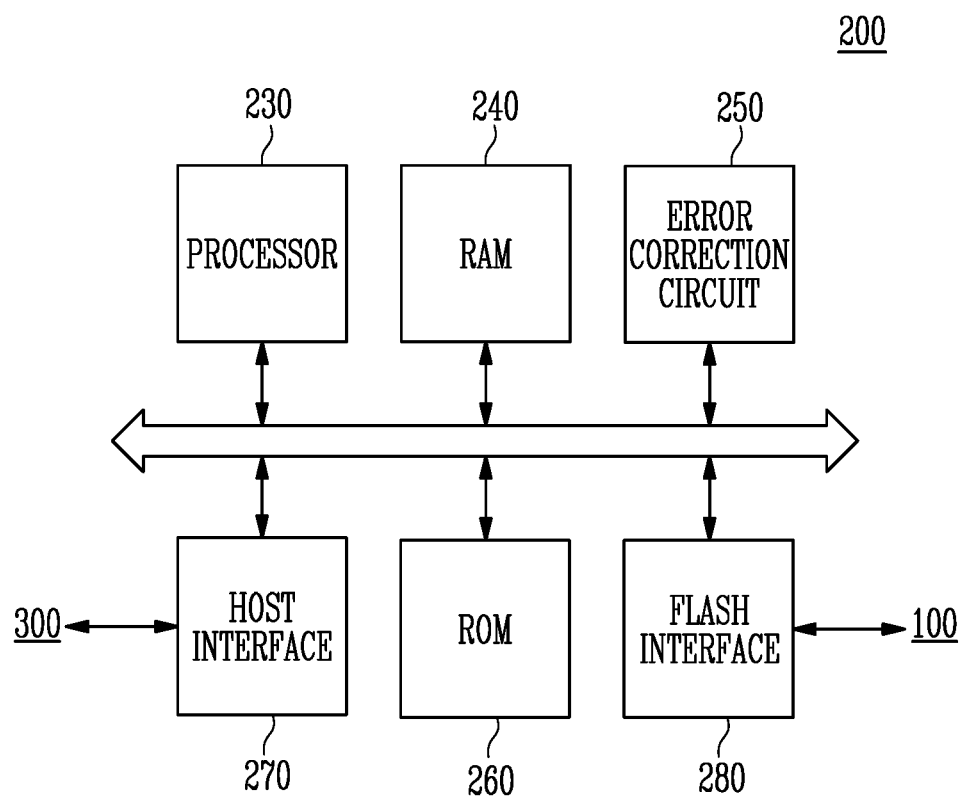
FIG. 14 is a diagram illustrating a memory controller shown in FIG. 1.

FIG. 14 is a diagram illustrating a memory controller shown in FIG. 1.

Referring to FIGS. 1 and 14, the memory controller 200 may include a processor 230, a RAM 240, an error correction circuit 250, a ROM 260, a host interface 270, and a flash interface 280.

The processor 230 may control overall operations of the memory controller 200. The RAM 240 may be used as a buffer memory, a cache memory, a working memory, etc. of the memory controller 200. In an embodiment, the plurality of cores 221, 222, 223, and 224 described with reference to FIG. 6 may be a component included in the processor 230.

The ROM 260 may store, in the form of firmware, various information required in operations of the memory controller 200.

The memory controller 200 may communicate with an external device (e.g., the host 300, an application processor, or the like) through the host interface 270. In an embodiment, the host controller 210 described with reference to FIG. 6 may be a component included in the host interface 270.

The memory controller 200 may communicate with the memory device 100 through the flash interface 280. The memory controller 200 may transmit a command CMD, an address ADDR, a control signal CTRL, and the like to the memory device 100 through the flash interface 280, and receive data DATA. For example, the flash interface 280 may include a NAND interface.

Figure 15:
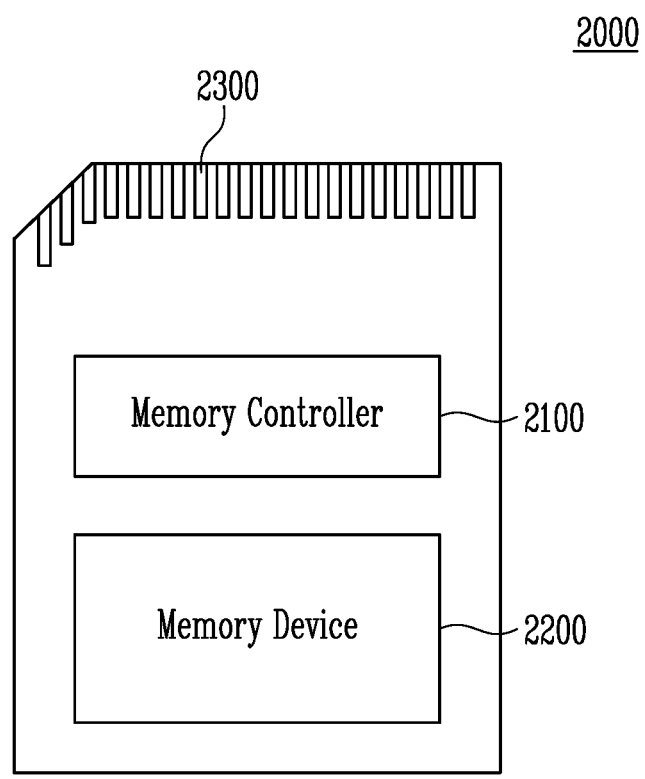
FIG. 15 is a block diagram illustrating a memory card system to which a storage device is applied in accordance with an embodiment of the present disclosure.

FIG. 15 is a block diagram illustrating a memory card system to which a storage device is applied in accordance with an embodiment of the present disclosure.

Referring to FIG. 15, the memory card system 2000 includes a memory controller 2100, a memory device 2200, and a connector 2300.

The memory controller 2100 is connected to the memory device 2200. The memory controller 2100 may access the memory device 2200. For example, the memory controller 2100 may control read, write, erase, and background operations of the memory device 2200. The memory controller 2100 provides an interface between the memory device 2200 and a host Host. The memory controller 2100 drives firmware for controlling the memory device 2200. The memory controller 2100 may be implemented identically to the memory controller 200 described with reference to FIG. 1. The memory device 2200 may be implemented identically to the memory device 100 described with reference to FIGS. 1 and 2.

For example, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. For example, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), firewire, a Universal Flash Storage (UFS), Wi-Fi, Bluetooth, and NVMe.

For example, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 16:
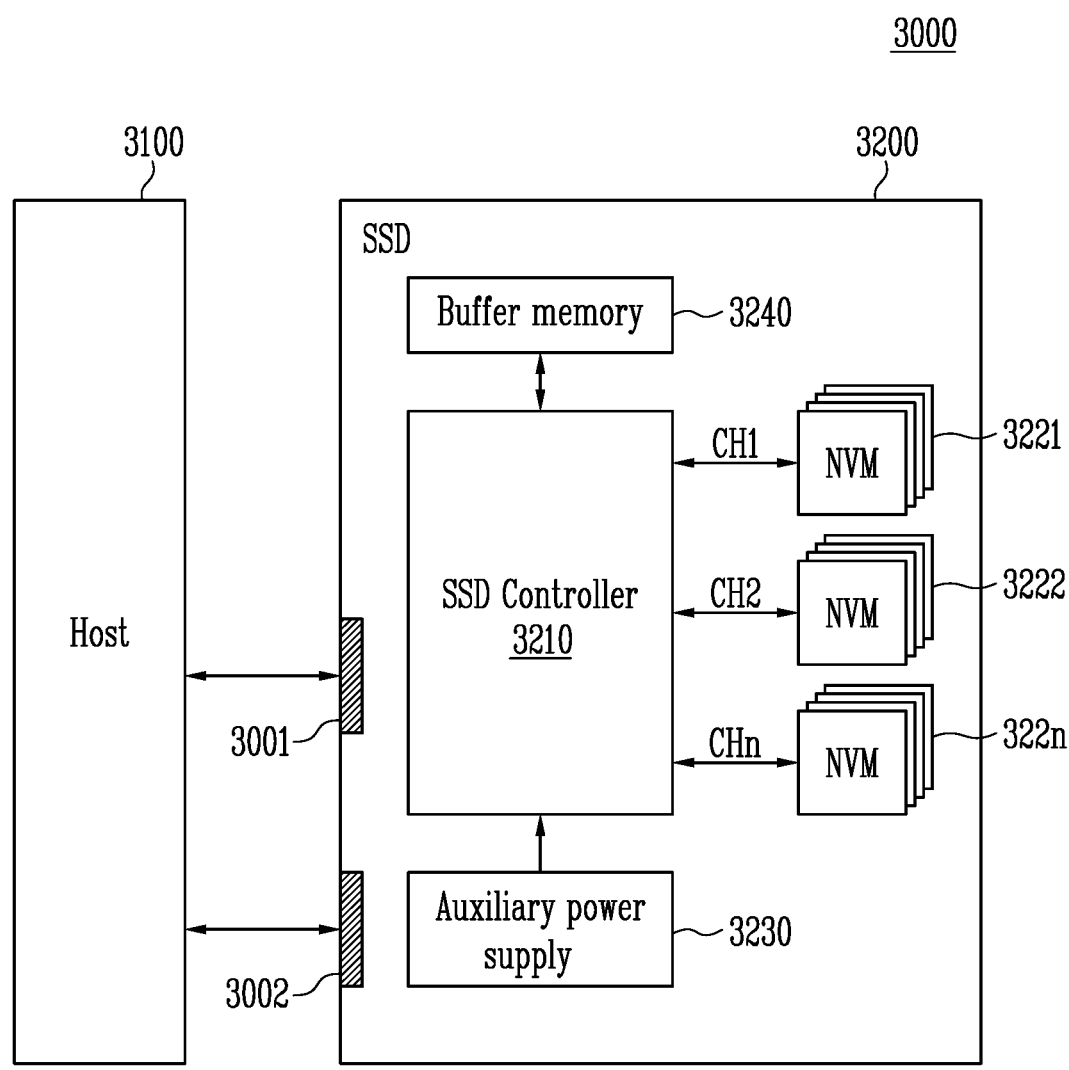
FIG. 16 is a block diagram exemplarily illustrating a Solid State Drive (SSD) system to which a storage device is applied in accordance with an embodiment of the present disclosure.

FIG. 16 is a block diagram exemplarily illustrating a Solid State Drive (SSD) system to which a storage device is applied in accordance with an embodiment of the present disclosure.

Referring to FIG. 16, the SSD system 3000 includes a host 3100 and an SSD 3200. The SSD 3200 exchanges a signal with the host 3100 through a signal connector 3001, and receives power through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal received from the host 3100. Exemplarily, the signal may be a signal based on an interface between the host 3100 and the SSD 3200. For example, the signal may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is connected to the host 3100 through the power connector 3002. When the supply of power from the host 3100 is not smooth, the auxiliary power supply 3230 may provide power of the SSD 3200. Exemplarily, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 17:
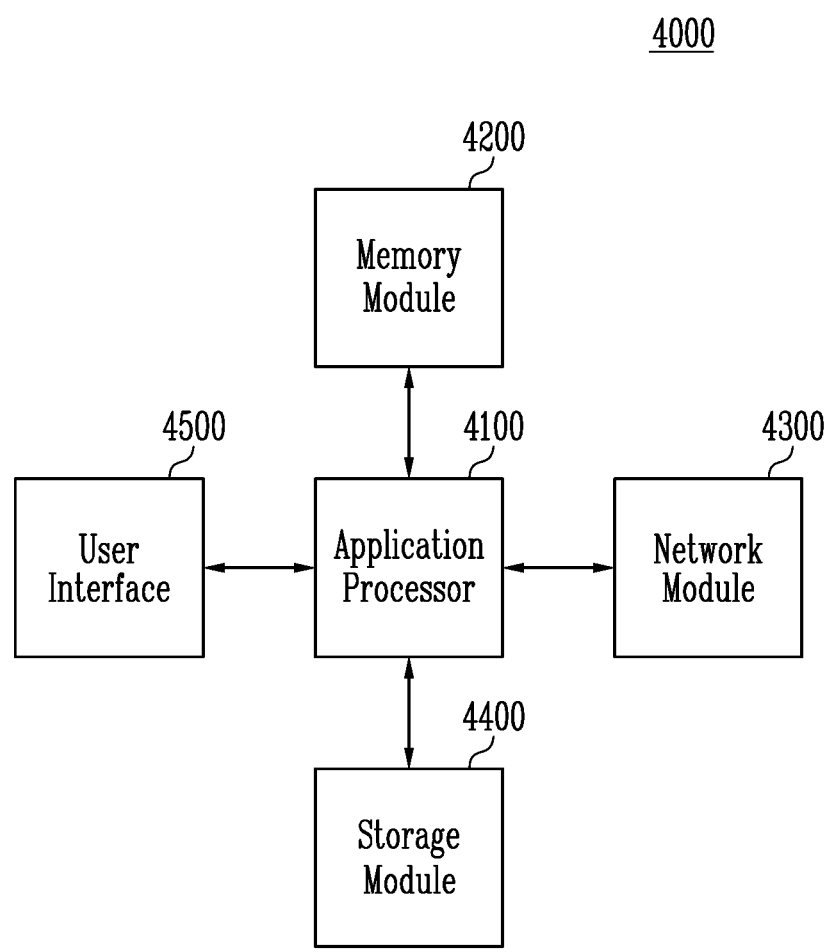
FIG. 17 is a block diagram illustrating a user system to which a storage device is applied in accordance with an embodiment of the present disclosure.

FIG. 17 is a block diagram illustrating a user system to which a storage device is applied in accordance with an embodiment of the present disclosure.

Referring to FIG. 17, the user system 4000 includes an application processor 4100, a memory module 4200, a network module 4300, a storage module 4400, and a user interface 4500.

The application processor 4100 may drive components included in the user system 4000, an operating system (OS), a user program, or the like. Exemplarily, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. For example, the application processor 4100 and the memory module 4200 may be provided as one semiconductor package by being packaged based on a Package on Package (PoP).

The network module 4300 may communicate with external devices. Exemplarily, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. For example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. For example, the storage module 4400 may be provided as a removable drive such as a memory card of the user system 4000 or an external drive.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or commands to the application processor 4100 or outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there can be provided a memory controller capable of equalizing wear levels of a plurality of cores for controlling a plurality of zones, and an operating method of the memory controller.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory controller for controlling a memory device including a plurality of memory blocks allocated to a plurality of zones, the memory controller comprising:
   a plurality of cores configured to control the plurality of zones;
   a reset information controller configured to generate reset count values representing a number of a reset request input with respect to the plurality of zones, in response to the reset request input from a host, and configured to generate reset count sum values obtained by summing the reset count values of a plurality of zones controlled by each of the plurality of cores; and
   a wear level manager configured to control the plurality of cores such that a core that is different from a first core having a highest reset count sum value from among the plurality of cores controls some of a plurality of zones controlled by the first core according to whether a difference value between the highest reset count sum value and a lowest reset count sum value from among the reset count sum values exceeds a threshold difference value.

2. The memory controller of claim 1, wherein the reset information controller includes:
   a reset count storage configured to store the reset count values; and
   a reset count sum storage configured to store the reset count sum values.

3. The memory controller of claim 1, wherein, when the difference value between the highest reset count sum value and the lowest reset count sum value exceeds the threshold difference value, the wear level manager controls the plurality of cores such that a second core having the lowest reset count sum value from among the plurality of cores controls a zone having a highest reset count value from among the plurality of zones controlled by the first core.

4. The memory controller of claim 3, wherein the first core and the second core control the memory device such that data corresponding to the zone having the highest reset count value is moved to memory blocks allocated to a zone newly generated by the second core.

5. The memory controller of claim 3, wherein the wear level manager controls the plurality of cores such that a core that is different from the second core controls some of a plurality of zones controlled by the second core from among the plurality of cores, while the second core controls the zone having the highest reset count value.

6. The memory controller of claim 5, wherein the wear level manager controls the plurality of cores such that the first core controls a zone having a lowest reset count value from among the plurality of zones controlled by the second core.

7. The memory controller of claim 6, wherein the first core and the second core control the memory device such that data corresponding to the zone having the lowest reset count value is moved to memory blocks allocated to a zone newly generated by the first core.

8. A memory controller for controlling a memory device including a plurality of memory blocks allocated to a plurality of zones, the memory controller comprising:
　a plurality of cores configured to control the plurality of zones;
　a reset information controller configured to generate reset count values representing a number of a reset request input with respect to the plurality of zones, in response to the reset request input from a host, and configured to generate erase count values representing a number of times an erase operation is performed on a plurality of memory block groups respectively corresponding to a plurality of zones controlled by each of the plurality of cores; and
　a wear level manager configured to control a first core, which controls a zone corresponding to a memory block group having a highest erase count value among the erase count values, and a second core, which controls a zone corresponding to a memory block group having a lowest erase count value among the erase count values, from among the plurality of cores such that the second core controls a zone having a highest reset count value from among a plurality of zones controlled by the first core according to whether a difference value between the highest erase count value and the lowest erase count value exceeds a threshold difference value.

9. The memory controller of claim 8, wherein each of the plurality of memory block groups is formed in a super block unit.

10. The memory controller of claim 8, wherein the reset information controller includes:
　a reset count storage configured to store the reset count values; and
　an erase count storage configured to store the erase count values.

11. The memory controller of claim 8, wherein, when the difference value between the highest erase count value and the lowest erase count value exceeds the threshold difference value, the wear level manager controls the plurality of cores such that the second core controls the zone having the highest reset count value from among a plurality of zones controlled by the first core.

12. The memory controller of claim 11, wherein the first core and the second core control the memory device such that data corresponding to the zone having the highest reset count value is moved to memory blocks allocated to a zone newly generated by the second core.

13. The memory controller of claim 11, wherein the wear level manager controls the plurality of cores such that a core that is different from the second core controls some of a plurality of zones controlled by the second core from among the plurality of cores, while the second core controls the zone having the highest reset count value.

14. The memory controller of claim 13, wherein the wear level manager controls the plurality of cores such that the first core controls a zone having a lowest reset count value from among the plurality of zones controlled by the second core.

15. The memory controller of claim 14, wherein the first core and the second core control the memory device such that data corresponding to the zone having the lowest reset count value is moved to memory blocks allocated to a zone newly generated by the first core.

16. A storage device comprising:
　a memory device including a plurality of memory blocks allocated to a plurality of zones; and
　a memory controller including a plurality of cores controlling the plurality of zones, the memory controller configured to generate reset count sum values obtained by summing reset count values of a plurality of zones controlled by each of the plurality of cores, and change zones controlled by the plurality of cores, based on a result obtained by comparing a difference value between the reset count sum values with a threshold difference value.

17. The storage device of claim 16, wherein the memory controller exchanges a zone, having a highest reset count value from among a plurality of zones controlled by a core having a highest reset count sum value from among the plurality of cores, with a zone having a lowest reset count value from among a plurality of zones controlled by a core having a lowest reset count sum value.

18. The storage device of claim 17, wherein the memory controller generates erase count values of a plurality of memory block groups respectively corresponding to the plurality of zones controlled by each of the plurality of cores, and changes the zones controlled by the plurality of cores, based on a result obtained by comparing a difference value of the erase count values with a threshold difference value.

19. The storage device of claim 18, wherein the memory controller exchanges a zone, having a highest reset count value among a plurality of zones controlled by a core controlling a zone corresponding to a memory block group having a highest erase count value from among the plurality of cores, with a zone having a lowest reset count value from among a plurality of zones controlled by a core controlling a zone corresponding to a memory block group having a lowest erase count value.

* * * * *